United States Patent
Wu

(10) Patent No.: US 11,991,623 B2
(45) Date of Patent: May 21, 2024

(54) CHOOSING CORE NETWORK TYPES

(71) Applicant: GOOGLE LLC, Mountain View, CA (US)

(72) Inventor: Chih-Hsiang Wu, Taoyuan (TW)

(73) Assignee: GOOGLE LLC, Mountain View, CA (US)

( * ) Notice: Subject to any disclaimer, the term of this patent is extended or adjusted under 35 U.S.C. 154(b) by 191 days.

(21) Appl. No.: 17/285,850

(22) PCT Filed: Oct. 15, 2019

(86) PCT No.: PCT/US2019/056307
§ 371 (c)(1),
(2) Date: Apr. 15, 2021

(87) PCT Pub. No.: WO2020/081555
PCT Pub. Date: Apr. 23, 2020

(65) Prior Publication Data
US 2021/0377848 A1 Dec. 2, 2021

Related U.S. Application Data

(60) Provisional application No. 62/746,761, filed on Oct. 17, 2018.

(51) Int. Cl.
*H04W 48/18* (2009.01)
*H04W 48/12* (2009.01)
*H04W 76/20* (2018.01)

(52) U.S. Cl.
CPC .......... *H04W 48/18* (2013.01); *H04W 48/12* (2013.01); *H04W 76/20* (2018.02)

(58) Field of Classification Search
CPC ..... H04W 48/18; H04W 48/12; H04W 76/20; H04W 92/10
See application file for complete search history.

(56) References Cited

U.S. PATENT DOCUMENTS 11,553,546 B2 * 1/2023 Karandikar ........... H04W 24/10
11,856,513 B2 * 12/2023 Abotabl ................. H04W 8/22
(Continued)

FOREIGN PATENT DOCUMENTS

| WO | WO-2016/006980 A1 | 1/2016 |
| WO | WO-2018/030859 A1 | 2/2018 |
| WO | WO-2018/124955 A1 | 7/2018 |

OTHER PUBLICATIONS

Qualcomm Incorporated, "Correction of CN type indication for RRC redirection from E-UTRA/5GC to E-UTRA/5GC or E-UTRAN", 3GPP Draft; R2-1815787_36.331 CR CN Type Type Indication for Redirection from E-UTRA-5GC to E-UTRAN or E-UTRA-5GC_V01, 3rd Generation Partnership Project (3GPP), Mobile Competence Centre; 650, Route, vol. Ran WG2, No. Chengdu, China, Oct. 12, 2018,; retrieved from the internet URL:http://www.3gpp.org/ftp/tsg%5FRAN/WG2%5FRL2/TSGR2%5F103bis/Docs/R2%2D1815787%2Ezip, retrieved on Oct. 12, 2018.

(Continued)

*Primary Examiner* — Julio R Perez
(74) *Attorney, Agent, or Firm* — MARSHALL, GERSTEIN & BORUN LLP

(57) ABSTRACT

A method in a user device that supports an air interface for connecting to core networks (CNs) of different types includes receiving system information from a first base station or a second base station (1102), determining, based on the received system information, at least two CN types of respective CNs to which the first base station is connected (1104), choosing a CN type from among the at least two CN types (1106), and performing a mobility management procedure with a CN of the chosen CN type via the first base station (1108).

36 Claims, 11 Drawing Sheets

(56) References Cited

U.S. PATENT DOCUMENTS

| | | | | |
|---|---|---|---|---|
| 2003/0219037 | A1* | 11/2003 | Toskala | H04W 28/22 370/328 |
| 2014/0146780 | A1 | 5/2014 | Mildh et al. | |
| 2018/0199278 | A1 | 7/2018 | Duan et al. | |
| 2018/0270745 | A1 | 9/2018 | Jeong et al. | |
| 2019/0021048 | A1 | 1/2019 | Kadiri et al. | |
| 2019/0261264 | A1* | 8/2019 | Lou | H04W 48/18 |
| 2020/0169941 | A1* | 5/2020 | Chen | H04W 28/085 |
| 2021/0409335 | A1* | 12/2021 | Zhu | H04L 47/24 |
| 2022/0053448 | A1* | 2/2022 | Velev | H04W 8/183 |
| 2022/0116334 | A1* | 4/2022 | Zhu | H04W 76/15 |
| 2022/0124043 | A1* | 4/2022 | Zhu | H04L 47/2475 |
| 2022/0124588 | A1* | 4/2022 | Zhu | H04W 36/22 |
| 2023/0093965 | A1* | 3/2023 | Velev | H04W 60/005 455/458 |
| 2023/0276332 | A1* | 8/2023 | Mostafa | H04W 8/24 370/331 |
| 2023/0370945 | A1* | 11/2023 | Chen | H04W 40/22 |

OTHER PUBLICATIONS

International Search Report and Written Opinion in International Application No. PCT/US2019/056307 dated Mar. 11, 2020, 13 pages.

Universal Mobile Telecommunications System (UMTS); Network Sharing; Architecture and Functional Description (3GPP TS 23.251 version 6.6.0 Release 6), Mar. 2006, 20 pages.

5G, System Architecture for the 5G System (3GPP TS 23.501 Version 15.3.0 Release 15), Sep. 2018, 227 pages.

First Examination Report for India Application No. 202147021070, dated Mar. 10, 2022.

3GPP TS 36.331 V14.8.0 (Sep. 2018), 3rd Generation Partnership Project; Technical Specification Group Radio Access Network; Evolved Universal Terrestrial Radio Access (E-UTRA); Radio Resource Control (RRC): Protocol Specification (Release 14), 773 pages.

3GPP TSG-RAN2 Meeting #103, R2-1813139, Gothenburg, Sweden, Aug. 20-24, 2018, "Capture NR Agreements Into 36.331 for E-UTRA Connected to 5GC", 138 pages.

"LTE; Evolved Universal Terrestrial Radio Access (E-UTRA); Radio Resource Control (RRC); Protocol Specification," 3GPP TS 36.331 v. 13.11.0 (Release 13) (Oct. 2018).

Intel Corporation "Capture NR Agreements into 36.311 for E-UTRA Connected to 5GC," 3GPP Draft (Aug. 24, 2018).

Office Action for European Application No. 19797528.7, dated Jul. 10, 2023.

* cited by examiner

CHOOSING CORE NETWORK TYPES

FIELD OF THE DISCLOSURE

This disclosure relates to wireless communications and, more particularly, to choosing, at a user device, a core network of a particular core network type when a base station provides connections to core networks of different types.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When expanding wireless communication networks, operators sometimes configure base stations to connect to core networks (CNs) of different types. Accordingly, these base stations and compatible user devices (commonly referred to using the acronym UE, which stands for "user equipment") can support air interfaces for establishing connections to different types of CNs. For example, an Evolved Universal Mobile Telecommunications System Terrestrial Radio Access (EUTRA) base station that operates in a Long Term Evolution (LTE) network can connect to an evolved packet core (EPC) or a more advanced fifth-generation core (5GC). Content and formatting of messages between such UEs and base stations in some cases depend on the type of the CN to which these messages pertain.

The 3rd Generation Partnership Project (3GPP) recently proposed to modify the protocol specification 3GPP TS 36.331 for EUTRA radio resource control (RRC) procedures and messages with specification R2-1813139 to support an EUTRA base station connected to a 5GC. The specification currently allows UEs to choose an EPC when the base station is connected to both an EPC and a 5GC, but fails to resolve problems associated with choosing a 5GC in such scenarios.

SUMMARY

A user device of this disclosure supports an air interface for connecting to CNs of different types (e.g., an EPC and a 5GC) via a base station. In different scenarios, a particular base station may be connected to one or more CNs of those CN types. For example, the base station may be an EUTRA next-generation evolved node B (ng-eNB) connected to an EPC, a 5GC, or both an EPC and a 5GC. The user device receives system information from a base station, such as a system information block (SIB) that is broadcast by the base station or received in a redirection command from another base station. The user device inspects the content of the received system information to determine which type or types of CNs is/are available via the target base station, and then chooses an available CN type. The user device may determine the available CN type(s) at an RRC layer, for example, and then communicate the available CN type(s) from the RRC layer to an upper layer, such as a mobility management (MM) layer, to allow the upper layer to choose a CN type from among the available CN type(s). Alternatively, the RRC layer may simply communicate one or more items of system information to the upper layer, and the upper layer may both determine the available CN type(s) and choose a CN type from among the available type(s). After choosing a CN type, this upper layer or a different upper layer may communicate the chosen CN type back to the RRC layer, and the user device may proceed with one or more MM and/or connection establishment procedures with a CN of the chosen CN type (e.g., a registration procedure, attach procedure, or tracking area update procedure).

One example embodiment of these techniques is a method in a user device that supports an air interface for connecting to CNs of different types. The method includes receiving, by processing hardware, system information from a base station, and determining, by the processing hardware and based on the received system information, at least two CN types of respective CNs connected to the target base station. The method also includes choosing, by the processing hardware, a CN type from among the at least two CN types, and performing, by the processing hardware, an MM procedure with a CN of the chosen CN type via the target base station.

Another example embodiment of these techniques is a non-transitory medium storing instructions. When executed by processing hardware of a user device, the instructions cause the user device to receive system information associated with a base station, and determine, based on the received system information, at least two CN types of respective CNs connected to a target base station. The instructions also cause the user device to choose a CN type from among the at least two CN types, and perform an MM procedure with a CN of the chosen CN type via the target base station.

DETAILED DESCRIPTION OF THE DRAWINGS

Generally speaking, the techniques of this disclosure allow a UE camped in a cell to choose from among all (or at least, two) of the types of CNs to which a base station of the cell is connected, provided the UE is compatible with those CNs. Thus, the UE may avoid unnecessarily defaulting to CNs that may be sub-optimal (e.g., to a less advanced CN, such as EPC relative to 5GC).

These techniques are discussed below with example reference to Evolved Universal Terrestrial Radio Access (EUTRA). Further, the examples relate to evolved packet core (EPC) and fifth-generation core (5GC) as the available (or potentially available) CN types. However, the techniques of this disclosure can apply to other pairs (or, potentially, larger numbers) of CNs, and other radio access technologies.

Figure 1:
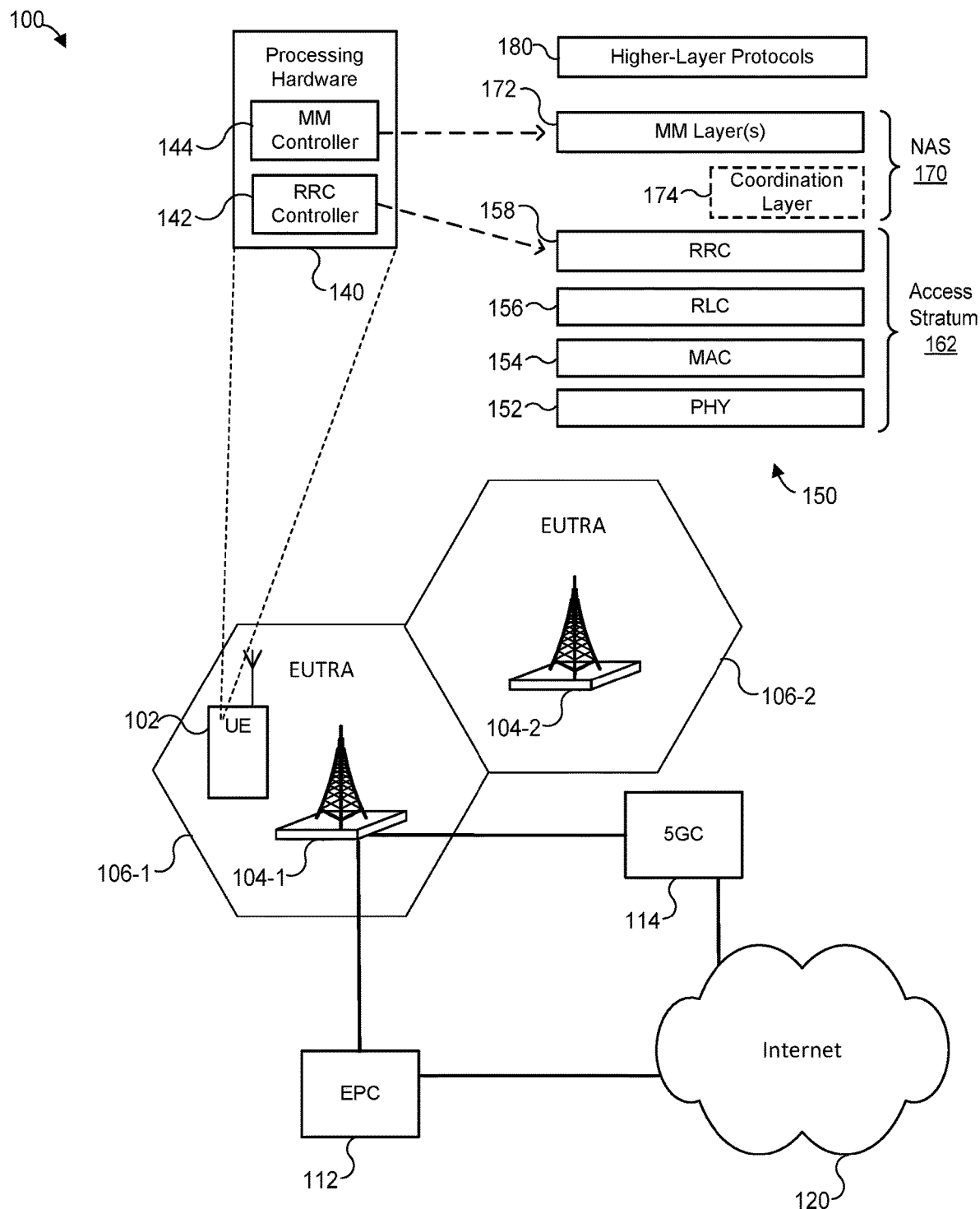
FIG. 1 is a block diagram of an example wireless communication network in which a user device of this disclosure is located in an EUTRA cell with a base station connected to an EPC and/or a 5GC.

Referring first to FIG. 1, a UE 102 can operate in an example wireless communication network 100. The wireless communication network 100 includes EUTRA base stations 104-1 and 104-2, associated with respective cells 106-1 and 106-2. While FIG. 1 depicts each of base stations 104-1 and 104-2 as serving only one cell, it is understood that the base station 104-1 and/or the base station 104-2 may also cover one or more additional cells not shown in FIG. 1. In general, the wireless communication network 100 can include any number of base stations, and each of the base stations can cover one, two, three, or any other suitable number of cells.

The base station 104-1 operates as an evolved Node B (eNB) or a next-generation eNB (ng-eNB). As seen in FIG. 1, the base station 104-1 is connected to an EPC 112 and a 5GC 114, each of which is in turn connected to the Internet 120. In other scenarios, the base station 104-1 may not be connected to the EPC 112, or may not be connected to the 5GC 114 (i.e., the wireless communication system 100 may omit the EPC 112, or may instead omit the 5GC 114). Although the connections are not shown in FIG. 1, the base station 104-2 (e.g., an eNB or ng-eNB) may be connected to an EPC (e.g., the EPC 112), and/or a 5GC (e.g., the 5GC 114).

The UE 102 can support an EUTRA air interface, and exchange messages with the base station 104-1 or 104-2 when operating in the EUTRA cell 106-1 or the EUTRA cell 106-2, respectively. The EUTRA air interface supports connections to EPCs as well as connections to 5GCs. As discussed below, the UE 102 can be any suitable device capable of wireless communications.

The UE 102 is equipped with processing hardware 140 that can include one or more general-purpose processors (e.g., CPUs) and a non-transitory computer-readable memory storing instructions that the one or more general-purpose processors can execute. Additionally or alternatively, the processing hardware 140 can include special-purpose processing units, such as a wireless communication chipset, for example. The processing hardware 140 includes an RRC controller 142 and an MM controller 144. Each of the controllers 142 and 144 is responsible for inbound messaging, outbound messaging, and internal procedures at the corresponding layer of a wireless communication protocol stack 150. For example, the RRC controller 142 may be configured to perform RRC establishment procedures for connecting to EPC or 5GC, and the MM controller 144 may be configured to perform MM functions such as attachment, registration and tracking area updates. In addition to supporting messaging external to the UE 102, the controllers 142 and 144 can exchange internal, "inter-protocol layer" (IPL) messages with each other. For example, as discussed further below, the MM controller 144 can choose a CN type, and send an indication of the chosen CN type to the RRC controller 142. The RRC controller 142 can then implement an RRC state machine that includes the RRC_IDLE and RRC_CONNECTED states of the chosen CN type and specify actions to be executed upon state transitions, for example. As used herein, the terms "communicate" and "send" include reference to the exchange of information between layers of a wireless communication protocol stack such as the protocol stack 150, with the communicating/sending layer being the information source and the receiving layer being the information destination.

The RRC controller 142 and the MM controller 144 can each be implemented using any suitable combination of hardware, software, and firmware. In one example implementation, the RRC controller 142 and the MM controller 144 are respective sets of instructions that define respective components of the operating system of the UE 102, and one or more CPUs execute these instructions to perform the respective RRC and MM functions. In another implementation, the RRC controller 142 and/or the MM controller 144 is/are implemented using firmware as a part of a wireless communication chipset.

The protocol stack 150, illustrated in a simplified manner in FIG. 1, includes a physical layer 152 (commonly abbreviated as PHY), a medium access control (MAC) layer 154, a radio link control (RLC) layer 156, and an RRC layer 158, as parts of an access stratum 162. A non-access stratum (NAS) 170 of the protocol stack 150 includes, among other layers, one or more MM layers 172 for handling registration, attachment, and tracking area update procedures. In some implementations, as discussed further below, the protocol stack 150 also includes a "coordination" layer 174, which coordinates operations and/or messaging between two or more of the MM layer(s) 172. The MM layer(s) 172 may include an Evolved MM (EMM) layer for performing evolved packet system (EPS) NAS procedures and a 5G MM (5GMM) layer for performing 5G system (5GS) NAS procedures, for example, and the coordination layer 174, if present in the protocol stack 150, may coordinate operations and/or messaging between the EMM and 5GMM layers.

While the MM controller 144 is referred to herein in the singular, in some implementations the MM controller 144 may include a separate controller for each of multiple layers within the MM layer(s) 172. As further illustrated in FIG. 1, the protocol stack 150 also supports higher-layer protocols 180 for various services and applications. The various layers 152, 154, 156, 158, 172, 174 and 180 are ordered as shown in FIG. 1. As used herein, the term "upper layer" is a relative term indicating that a given layer is above a reference layer, and "lower layer" is a relative term indicating that a given layer is below a reference layer. Thus, for example, each of the one or more MM layers 172 is an upper layer relative to the RRC layer 158, while each of the layers 152, 154 and 156 is a lower layer relative to the RRC layer 158. Wherever the term "upper layer" is used herein without explicitly indicating the reference layer, the reference layer is an RRC layer (e.g., RRC layer 158).

For simplicity, the discussion that follows at times describes various actions as being performed by particular layers rather than their respective controllers. In each such instance, it is understood that the respective controller performs the indicated action(s). For example, while the discussion below refers to various layers sending or receiving IPL messages to exchange information between layers, it is understood that it is the respective controllers that send or receive those IPL messages. Similarly, when the discussion below refers to an action (e.g., determining available CN types or choosing a CN type) occurring "at" a particular layer, it is understood that the respective controller performs that action. Moreover, references to a particular layer performing an action (e.g., receiving, determining, sending, etc.) specifically refer to the layer as implemented by the user device or UE, unless expressly stated otherwise.

Also for simplicity, FIG. 1 does not depict various components of UE 102. For example, UE 102 also includes a transceiver, which comprises various hardware, firmware, and software components that are configured to transmit and receive wireless signals according to the EUTRA air interface. The processing hardware 140 can send commands and exchange data with the transceiver as needed to perform various connection establishment procedures, perform various MM procedures, or communicate with other UEs or servers, etc. (e.g., when utilizing data or voice services).

Next, example methods and messaging that the UE 102 can implement and execute, alone or in combination with other components of the network 100, are discussed with reference to FIGS. 2-11. The UE 102 can implement at least some of the acts of these methods in software, firmware, hardware, or any suitable combination of software, firmware, and hardware. Although FIGS. 2-11 are discussed below with reference to the components depicted in FIG. 1, in general any suitable components may be used.

Figure 2:
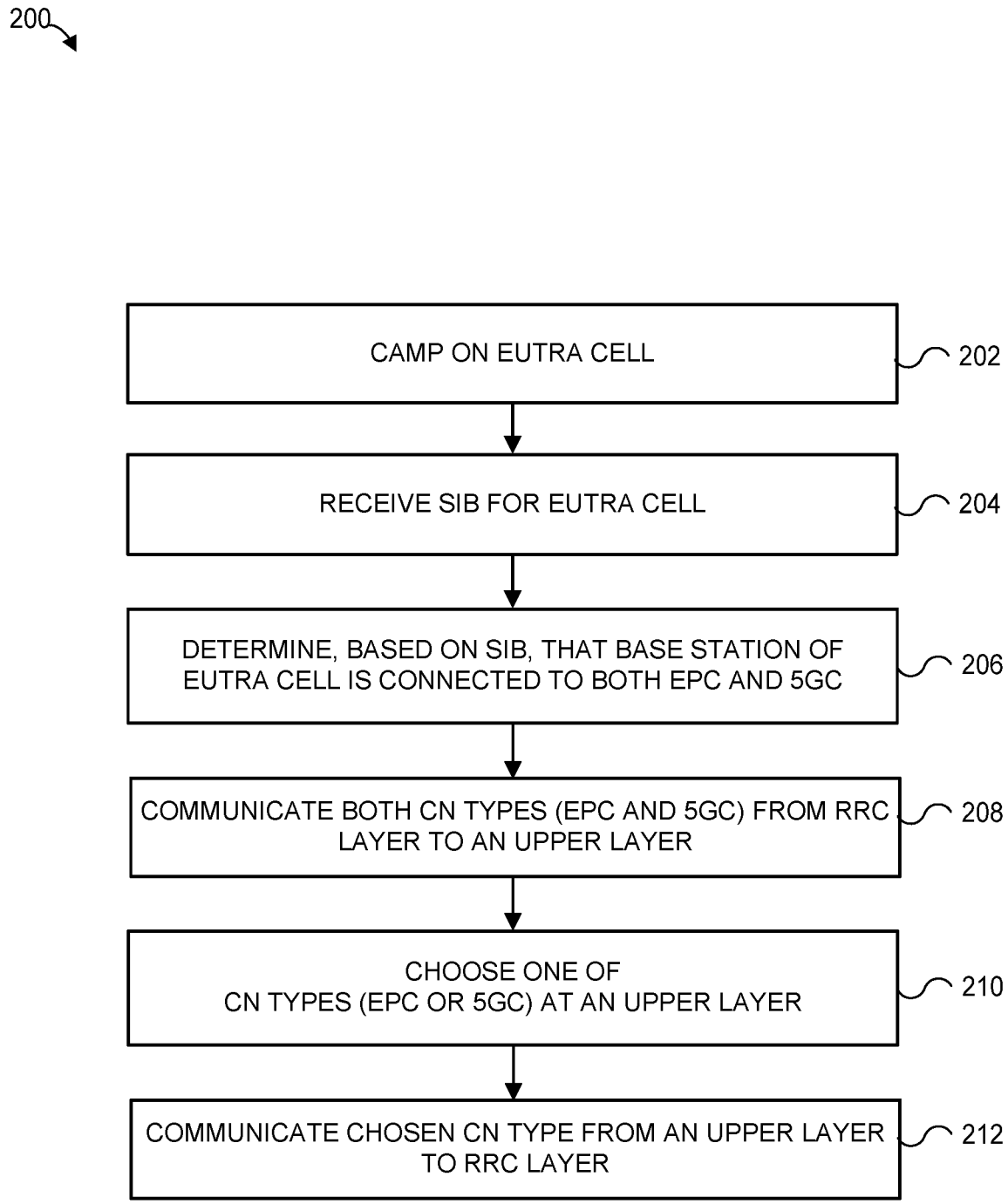
FIG. 2 is a flow diagram of an example method in the user device for choosing an EPC or a 5GC after selecting or reselecting an EUTRA cell in which both CN types are available.

Referring to FIG. 2, an example method 200 for choosing a CN type can be implemented in the UE 102. In the method 200, the UE 102 camps on the EUTRA cell 106-1 at block 202. Block 202 may occur in response to a cell selection or cell reselection process performed by the UE 102, for example, or in response to a redirection command (e.g., an RRC Release message or an RRC Connection Release message) that the UE 102 receives from the base station of another cell (e.g., base station 104-2 of the EUTRA cell 106-2).

At block 204, the UE 102 receives a system information block (SIB) for the EUTRA cell 106-1. The SIB may be a "SIB1" that assists UEs in evaluating cell access, for example. In different scenarios, the SIB may be received from the base station 104-1 (e.g., when the base station 104-1 broadcasts SIB1 within the EUTRA cell 106-1), or from the base station 104-2 (e.g., in a redirection command from the base station 104-2, if block 204 occurs before block 202).

The SIB may specify the types of the CNs 112, 114 to which the base station 104-1 is connected (i.e., in the scenario shown in FIG. 1, both EPC and 5GC), or may only implicitly indicate the CN types. As the term is used herein, information (e.g., a message) "specifies" something (e.g., a fact or requirement) if the information explicitly indicates that thing. Also as used herein, information "indicates" something if the information explicitly indicates that thing, or if the information only implicitly indicates that thing. Thus, for example, a message specifies (i.e., expressly indicates) a CN type if the message includes a field (or parameter, etc.) that is dedicated to expressing CN type. Conversely, a message implicitly indicates (but does not specify) a CN type if the message does not include any field (or parameter, etc.) dedicated to expressing CN type, but does include information that may be processed, analyzed, etc., to infer CN type.

At block 206, the UE 102 determines, at the RRC layer 158 (i.e., by the RRC controller 142) and based on the SIB received at block 204, that the base station 104-1 of the EUTRA cell 106-1 is connected to both an EPC and a 5GC. In implementations where the SIB specifies the CN types, block 206 includes simply reading/inspecting those CN types. In implementations where the SIB only implicitly indicates the CN types, however, block 206 includes reading/inspecting other information in the SIB, and inferring the CN types based on that other information. Various types of SIB information that the UE 102 may use to infer CN type or types are discussed below in connection with FIGS. 8-10.

At block 208, the UE 102 communicates both CN types (EPC and 5GC) from the RRC layer 158 to an upper layer (e.g., one of the MM layer(s) 172 or the coordination layer 174). For example, the RRC layer 158 may generate an IPL message that specifies both CN types, and send the IPL message to the upper layer.

At block 210, the UE 102 chooses one of the CN types (EPC or 5GC) at an upper layer (e.g., one of the MM layer(s) 172 or the coordination layer 174). The layer choosing the CN type may be the layer to which the RRC layer 158 communicated the CN types at block 208, or a different upper layer (e.g., in the MM layer(s) 172). In some implementations, the upper layer chooses the CN type according to a predetermined rule. For example, a manufacturer may configure the rule during manufacture of the UE 102, a Universal Subscriber Identity Module (USIM) inserted in the UE 102 may configure the rule, or an operator network may send the rule to the UE 102 in a message. The rule may be priority-based, and assign a higher priority to 5GC than to EPC (or vice versa), for instance. In other implementations, the rule may be more complex. In one implementation, for example, 5GC is given a higher priority than EPC if a first condition is satisfied (e.g., the UE 102 initiated an Internet service), but EPC is given a higher priority than 5GC if a second condition is satisfied (e.g., the UE 102 initiated an emergency service or an Internet Protocol multimedia subsystem (IMS) voice call). In additional implementations, the rule may depend on authorization of access on EPC or 5GC. In one implementation, the UE 102 is not authorized to access 5GC because the UE 102 receives an EPS NAS message or a 5GS NAS message which rejects access of the UE 102 to 5GC, or indicates the UE 102 is not authorized to access 5GC. In this case, the UE 102 may choose EPC instead of 5GC. In another implementation, the UE 102 is not authorized to access EPC because the UE 102 receives an EPS NAS message or a 5GS NAS message which rejects access of the UE 102 to EPC, or indicates the UE 102 is not authorized to access EPC. In this case, the UE 102 may choose 5GC instead of EPC. In a further implementation, the UE 102 is not authorized to access 5GC if the UE 102 disables its N1 mode capability.

At block 212, the UE 102 communicates the chosen CN type from an upper layer (e.g., one of the MM layer(s) 172 or the coordination layer 174) to the RRC layer 158. The layer communicating the chosen CN type may be the layer to which the RRC layer 158 communicated the CN types at block 208 and/or the layer that chose the CN type at block 210, or may instead be a different upper layer (e.g., in the MM layer(s) 172). Various implementations in which only a single upper layer is involved in the operations of blocks 208, 210 and 212, and in which multiple upper layers are involved in those operations, are discussed below in connection with FIGS. 3-6.

The upper layer communicating the chosen CN type may generate an IPL message specifying the chosen CN type, and send the IPL message to the RRC layer 158. For example, the IPL message may include "EPC" if EPC is chosen, or "5GC" if 5GC is chosen. In another implementation, the IPL message includes "5GC" if 5GC is chosen and omits "5GC" if EPC is chosen (i.e., the IPL message only implicitly identifies EPC). In yet another implementation, the IPL message includes "EPC" if EPC is chosen and omits "EPC" if 5GC is chosen (i.e., the IPL message only implicitly identifies 5GC).

In still other embodiments, the IPL message implicitly indicates the chosen CN type regardless of which CN type is chosen, by providing information that is in some way associated with the chosen CN type. In one such implementation, the IPL message includes a NAS layer identity of the chosen CN type. For example, the IPL message may contain a 5GS system architecture evolution (SAE) temporary mobile subscriber identity (TMSI), or "S-TMSI," if the chosen CN type is 5GC, but instead contain an EPS S-TMSI if the chosen CN type is EPC. In another example, the IPL message may contain registered Mobility Management Entity (MME) information if the chosen CN type is EPC, but instead contain registered Access and Mobility Management Function (AMF) information if the chosen CN type is 5GC. In yet another example, the IPL message may contain slice information associated with 5GS (e.g., Single Network Slice Selection Assistance Information (S-NSSAI)) if the chosen CN type is 5GC, but omit that information (or not send the IPL message at all) if the chosen CN type is EPC.

Figure 5:
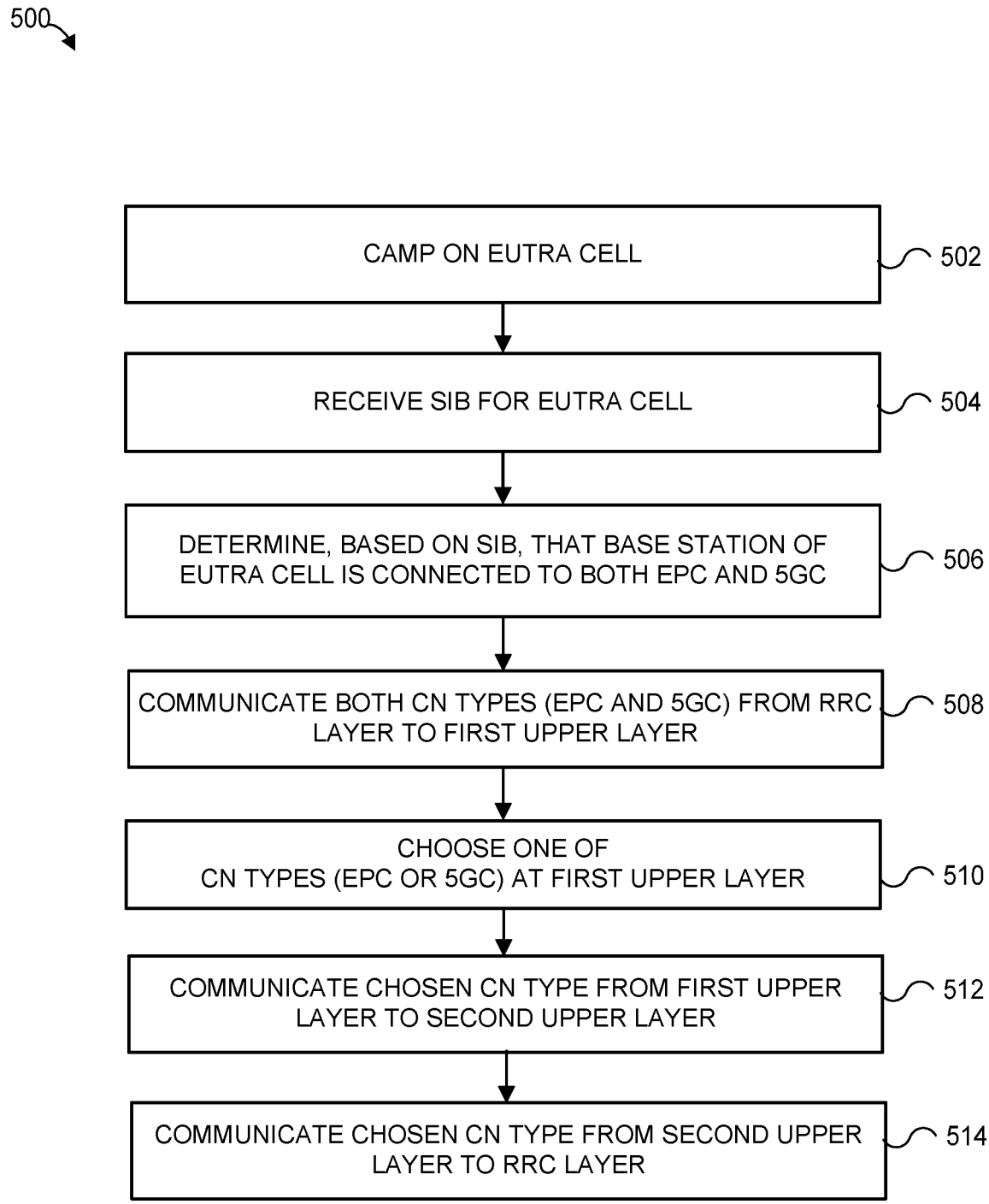
FIG. 5 is a flow diagram of an example method in the user device, corresponding to a second embodiment of the method of FIG. 2.
Figure 6:
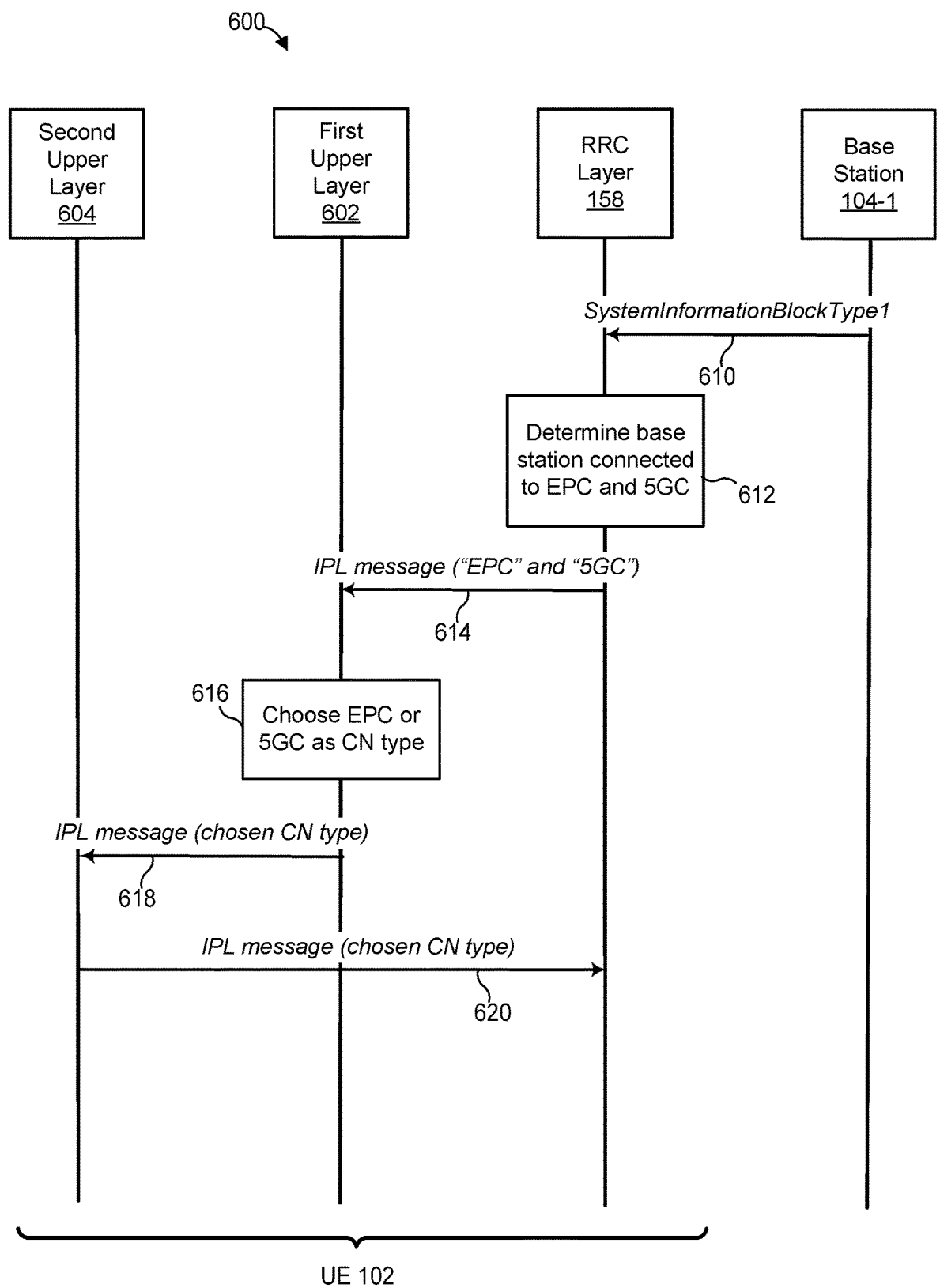
FIG. 6 is a messaging diagram corresponding to an embodiment of the method of FIG. 5.

In some implementations and/or scenarios, the method 200 includes one or more additional blocks not shown in FIG. 2. In implementations where blocks 210 and 212 are performed at different layers (e.g., block 210 at the coordination layer 174 and block 212 at one of the MM layer(s) 172), for example, the method 200 may include an additional block, between blocks 210 and 212, at which the upper layer performing block 210 communicates the chosen CN type to the upper layer performing block 212. Such an embodiment is shown in FIGS. 5 and 6, and discussed below.

As another example, the method 200 may include an additional block, after block 212, at which the UE 102 performs an MM procedure in accordance with the chosen CN type. If an upper layer chooses EPC at block 210, for example, the UE 102 (e.g., an EMM layer of the MM layer(s) 172) may perform an EPS NAS Attach procedure by transmitting an EPS NAS ATTACH REQUEST message to the EPC 112 via the base station 104-1, or perform an EPS NAS Tracking Area Update (TAU) procedure by transmitting an EPS NAS TRACKING AREA UPDATE REQUEST message to the EPC 112 via the base station 104-1. If an upper layer instead chooses 5GC at block 210, the UE 102 (e.g., a 5GMM layer of the MM layer(s) 172) may perform a 5GS NAS Registration procedure by transmitting a 5GC NAS REGISTRATION message to the 5GC 114 via the base station 104-1.

As still another example, the method 200 may include an additional block, after block 212, at which the UE 102 performs a connection establishment procedure in accordance with the chosen CN type. For example, the UE 102 may transmit an RRC Connection Request message to the base station 104-1, and in response receive an RRC Connection Setup message from the base station 104-1. In response to the RRC Connection Setup message, and in accordance with the chosen CN type, the UE 102 may include a NAS layer identity or registered AMF information in an RRC Connection Setup Complete message, and transmit the RRC Connection Setup Complete message to the base station 104-1. In a further example, if the RRC layer 158 determines a cell the UE 102 currently camps on is barred for the chosen CN type, the RRC layer 158 may perform the connection establishment procedure in accordance with a CN type other than the chosen CN type.

While FIG. 2 corresponds to a scenario in which the base station 104-1 is connected to both the EPC 112 and the 5GC 114, the contents of the SIB received at block 204, and the operation of UE 102 after receiving the SIB, differ in scenarios where the base station 104-1 is instead only connected to the EPC 112 or only connected to the 5GC 114. If the base station 104-1 is only connected to the EPC 112, for example, the SIB received at block 204 indicates (explicitly or implicitly) EPC and not 5GC, the RRC layer 158 determines that the base station 104-1 is connected to only an EPC at block 206, the RRC layer 158 communicates the CN type "EPC" to an upper layer (e.g., one of MM layer(s) 172 or coordination layer 174) at block 208, an upper layer (e.g., one of MM layer(s) 172 or coordination layer 174) chooses EPC as the CN type at block 210, and an upper layer (e.g., one of MM layer(s) 172) communicates EPC as the chosen CN type to the RRC layer 158 at block 212. Conversely, if the base station 104-1 is only connected to the 5GC 114, the SIB received at block 204 indicates (explicitly or implicitly) 5GC and not EPC, the RRC layer 158 determines that the base station 104-1 is connected to only a 5GC at block 206, the RRC layer 158 communicates the CN type "5GC" to an upper layer (e.g., one of MM layer(s) 172 or coordination layer 174) at block 208, an upper layer (e.g., one of MM layer(s) 172 or coordination layer 174) chooses 5GC as the CN type at block 210, and an upper layer (e.g., one of MM layer(s) 172) communicates 5GC as the chosen CN type to the RRC layer 158 at block 212.

In some implementations, and in scenarios where the UE 102 selects the EUTRA cell 106-1 in response to a redirection command (e.g., an RRC Release message or an RRC Connection Release message) that indicates a commanded CN type, the RRC layer 158 includes the commanded CN type in an IPL message that the RRC layer 158 sends to an upper layer. In such a scenario, the upper layer chooses the commanded CN type as the CN type, and the RRC layer 158 may or may not also communicate the available CN type(s) indicated in the SIB to an upper layer. In implementations where the RRC layer 158 does communicate the CN type(s) indicated in the SIB to an upper layer along with the commanded CN type, the upper layer may simply ignore the CN types indicated in the SIB, and choose the commanded CN type. In some implementations, an upper layer communicates the chosen (commanded) CN type back to the RRC layer 158. In other implementations, however, no upper layer communicates the chosen (commanded) CN type back to the RRC layer 158, because the RRC layer 158 is already aware of the commanded CN type.

Figure 3:
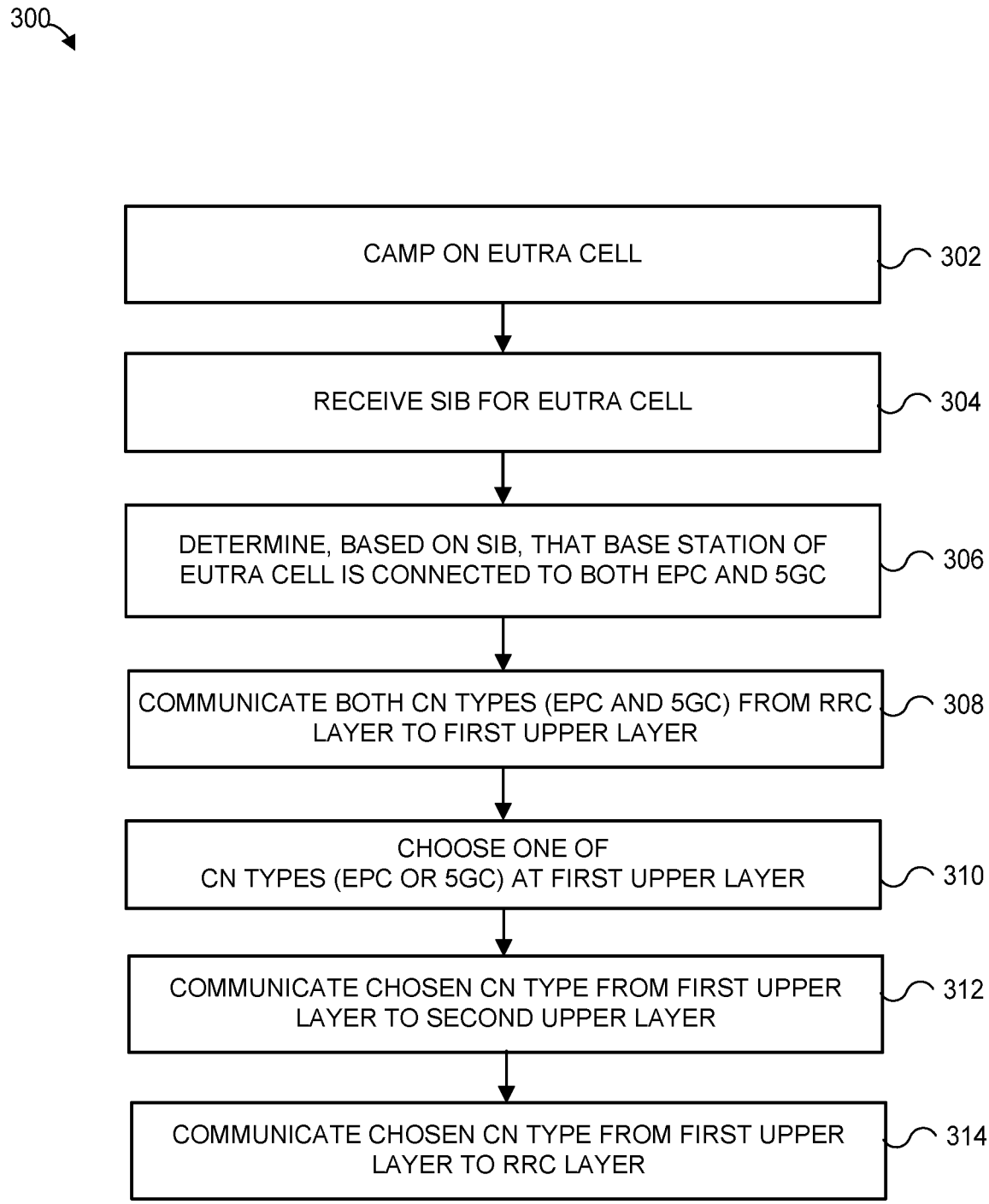
FIG. 3 is a flow diagram of an example method in the user device, corresponding to a first embodiment of the method of FIG. 2.
Figure 4:
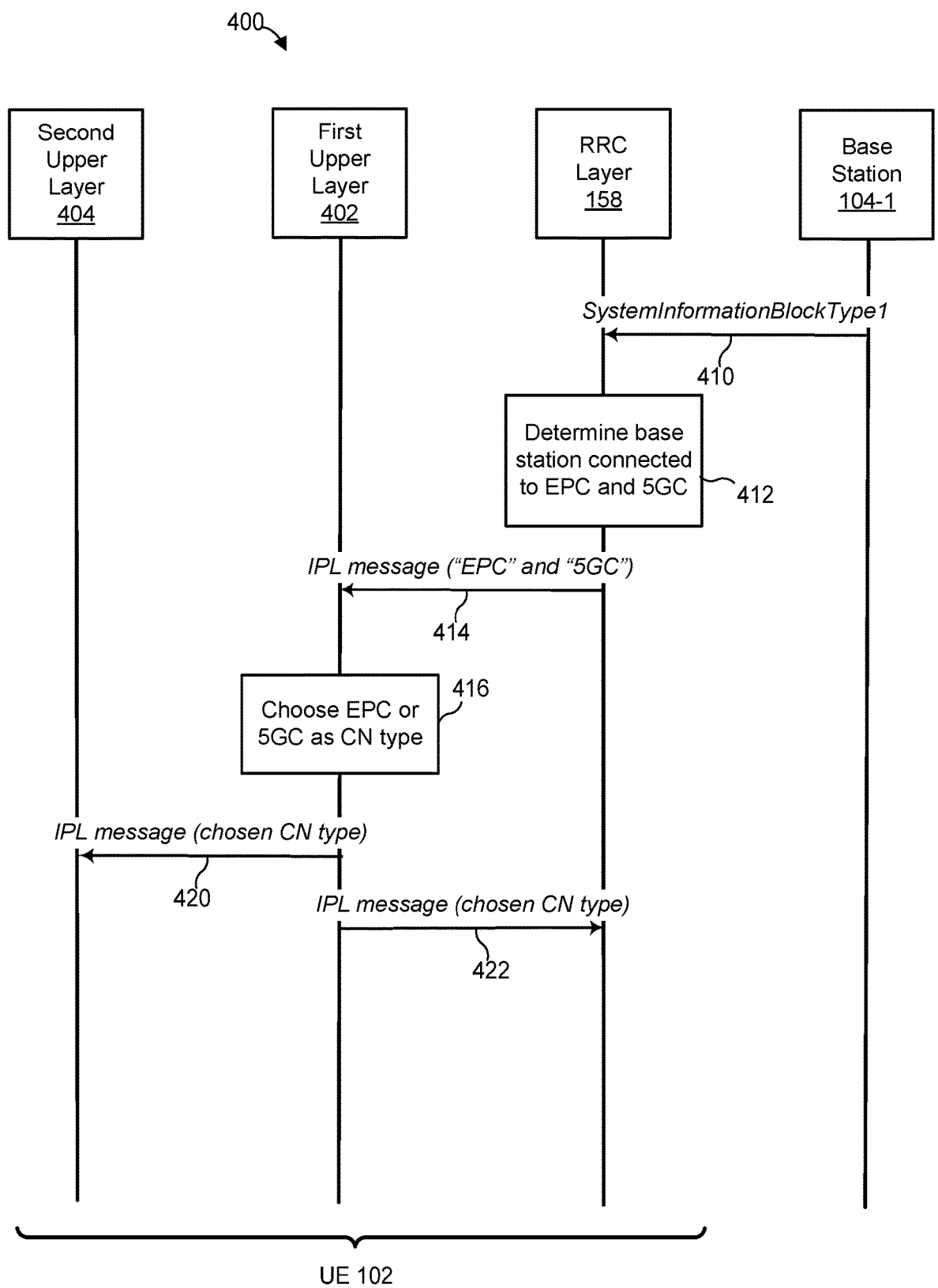
FIG. 4 is a messaging diagram corresponding to an embodiment of the method of FIG. 3.

FIGS. 3 and 4 both correspond to a first implementation of the method 200 in which the upper layer that chooses the CN type informs the RRC layer 158 of the chosen CN type, while FIGS. 5 and 6 both correspond to a second implementation of the method 200 in which a first upper layer chooses the CN type and a second upper layer informs the RRC layer 158 of the chosen CN type. As with FIG. 2, FIGS. 3-6 each correspond to a scenario where the base station 104-1 is connected to both the EPC 112 and the 5GC 114.

Referring first to FIG. 3, an example method 300 for choosing a CN type can be implemented in the UE 102. As noted above, the method 300 represents a particular embodiment of the method 200 in which the upper layer that chooses a CN type is the same layer that informs the RRC layer 158 of the chosen CN type. In the method 300, the UE 102 camps on the EUTRA cell 106-1 at block 302, receives a SIB for the EUTRA cell 106-1 at block 304, and determines, based on the SIB, that the base station 104-1 is connected to both an EPC and a 5GC at block 306. Blocks 302, 304 and 306 may be the same as blocks 202, 204 and 206, respectively, of the method 200, for example.

At block 308, the UE 102 communicates both CN types (EPC and 5GC) from the RRC layer 158 to a first upper layer (e.g., a first one of the MM layer(s) 172, or the coordination layer 174). For example, the RRC layer 158 may generate an IPL message that specifies both CN types, and send the IPL message to the first upper layer. In other implementations, the RRC layer 158 includes each of the two CN types in a different IPL message sent to the first upper layer. However, separate IPL messages may cause the UE 102 to waste power by performing unnecessary MM/NAS procedures. If the RRC layer 158 sends the first upper layer a first IPL message indicating that EPC is available in the EUTRA cell 106-1, for example, the first upper layer (or a second upper layer) may cause the UE 102 to perform an EPS Attach procedure. If the RRC layer 158 later sends the first upper layer a second IPL message indicating that 5GC is available in the EUTRA cell 106-1, and if the first upper layer decides to change from EPC to 5GC based on this knowledge, the first upper layer (or a second upper layer) may cause the UE 102 to perform a 5GS Registration procedure. In such a scenario, the EPS Attach procedure would have been unnecessary.

At block 310, the UE 102 chooses one of the CN types (EPC or 5GC) at the first upper layer. In some implementations, the first upper layer chooses the CN type according to a predetermined rule (e.g., as discussed above in connection with block 210 of the method 200).

At block 312, the UE 102 communicates the chosen CN type from the first upper layer to a second upper layer (e.g., one of the MM layer(s) 172 if the first upper layer is the coordination layer 174, or a different one of the MM layer(s) 172 if the first upper layer is also one of the MM layer(s) 172). For example, the first upper layer may generate an IPL message that specifies the chosen CN type, and send the IPL message to the second upper layer. In some implementations, the second upper layer to which the first upper layer communicates the chosen CN type depends upon which CN type was chosen at block 310. For example, the second upper layer may be an EMM if EPC is chosen, or a 5GMM if 5GC is chosen (e.g., as discussed below in connection with messaging diagram 400).

At block 314, the UE 102 communicates the chosen CN type from the first upper layer to the RRC layer 158. To this end, the first upper layer may generate another IPL message specifying the chosen CN type, and send the IPL message to the RRC layer 158. For example, the IPL message may include "EPC" if EPC is chosen, or "5GC" if 5GC is chosen. In another implementation, the IPL message includes "5GC" if 5GC is chosen, and omits "5GC" if EPC is chosen (i.e., the IPL message only implicitly identifies EPC). In yet another implementation, the IPL message includes "EPC" if EPC is chosen, and omits "EPC" if 5GC is chosen (i.e., the IPL message only implicitly identifies 5GC). In still other embodiments, the IPL message only implicitly indicates the chosen CN type regardless of which CN type is chosen (e.g., as discussed above in connection with block 212 of the method 200). Block 314 may occur before, after, or during block 312, depending on the implementation.

In some implementations and/or scenarios, the method 300 includes one or more additional blocks not shown in FIG. 3. For example, the method 300 may include an additional block, after block 314, at which the UE 102 performs an MM and/or connection establishment procedure in accordance with the chosen CN type (e.g., as discussed above in connection with the method 200).

While FIG. 3 corresponds to a scenario in which the base station 104-1 is connected to both the EPC 112 and the 5GC 114, the contents of the SIB received at block 304, and the operation of the UE 102 after receiving the SIB, differ in scenarios where the base station 104-1 is instead only connected to the EPC 112 or only connected to the 5GC 114. If the base station 104-1 is only connected to the EPC 112, for example, the SIB received at block 304 indicates (explicitly or implicitly) EPC and not 5GC, the RRC layer 158 determines that the base station 104-1 is connected to only an EPC at block 306, the RRC layer 158 communicates the CN type "EPC" to the first upper layer (e.g., one of MM layer(s) 172 or coordination layer 174) at block 308, the first upper layer chooses EPC as the CN type at block 310, the first upper layer communicates EPC as the chosen CN type to the second upper layer at block 312, and the first upper layer communicates EPC as the chosen CN type to the RRC layer 158 at block 314. Conversely, if the base station 104-1 is only connected to the 5GC 114, the SIB received at block 304 indicates (explicitly or implicitly) 5GC and not EPC, the RRC layer 158 determines that the base station 104-1 is connected to only a 5GC at block 306, the RRC layer 158 communicates the CN type "5GC" to the first upper layer (e.g., one of MM layer(s) 172 or coordination layer 174) at block 308, the first upper layer chooses 5GC as the CN type at block 310, the first upper layer communicates 5GC as the chosen CN type to the second upper layer at block 312, and the first upper layer communicates 5GC as the chosen CN type to the RRC layer 158 at block 314.

In some implementations, and in scenarios where the UE 102 selects the EUTRA cell 106-1 in response to a redirection command (e.g., an RRC Release message or an RRC Connection Release message) that indicates a commanded CN type, the RRC layer 158 includes the commanded CN type in then IPL message that the RRC layer 158 sends to the first upper layer at block 308. In such a scenario, the first upper layer chooses the commanded CN type as the CN type, and the RRC layer 158 may or may not also communicate the available CN type(s) indicated in the SIB to the first upper layer. In implementations where the RRC layer 158 does communicate the CN type(s) indicated in the SIB to the first upper layer along with the commanded CN type, the first upper layer may simply ignore the CN types indicated in the SIB, and choose the commanded CN type. In some implementations, the first upper layer communicates the chosen (commanded) CN type back to the RRC layer 158. In other implementations, however, the first upper layer does not do so, because the RRC layer 158 is already aware of the commanded CN type.

FIG. 4 is a messaging diagram 400 depicting messages exchanged between the base station 104-1 and the UE 102, as well as messages exchanged between various layers of the protocol stack 150 within the UE 102, in accordance with one implementation of the method 300. In addition to the RRC layer 158, these layers include a first upper layer 402 (i.e., a first layer above the RRC layer 158) and a second layer 404 (i.e., a second layer above the RRC layer 158, and possibly also above the first upper layer 402). In some implementations, the first upper layer 402 is the coordination layer 174 and the second upper layer 404 is one of the MM layer(s) 172. In other implementations, the first upper layer 402 is a first one of the MM layer(s) 172 and the second upper layer 404 is a second one of the MM layer(s) 172. Examples of both of these implementations are discussed in further detail below.

In the messaging diagram 400, the base station 104-1 transmits 410 (e.g., broadcasts) a SIB1, which the UE 102 receives and processes at the RRC layer 158. In other implementations, the UE 102 receives the SIB1 from another source, such as the base station 104-2 (e.g., in a redirection command). The RRC layer 158 determines 412 that the base station 104-1 is connected to both an EPC and a 5GC, and sends 414 an IPL message indicating both CN types to the first upper layer 402.

The first upper layer 402 then chooses 416 either EPC or 5GC as the CN type, and sends 420 a first IPL message indicating the chosen CN type to the second upper layer 404. The first upper layer 402 also sends 422 a second IPL message indicating the chosen CN type to the RRC layer 158. In other implementations, the first upper layer 402 instead sends 420 an IPL message to the second upper layer 404 after sending 422 the IPL message to the RRC layer 158, or does not send any IPL message to the second upper layer 404.

In one implementation, the first upper layer 402 is an EMM layer of the MM layer(s) 172 and the second upper layer 404 is a 5GMM layer of the MM layer(s) 172. If the first (EMM) upper layer 402 chooses 416 5GC as the CN type, the first (EMM) upper layer 402 sends 420 an IPL message indicating 5GC as the CN type to the second (5GMM) upper layer 404, and sends 422 another IPL message indicating 5GC as the CN type to the RRC layer 158. The second (5GMM) upper layer 404 may then perform a 5GS MM (e.g., registration) procedure. If the first (EMM) upper layer 402 instead chooses 416 EPC as the CN type, the first (EMM) layer 402 sends an IPL message indicating EPC as the CN type to the RRC layer 158. The first (EMM) upper layer 402 may then perform an EPS MM (e.g., attach or tracking area update) procedure. The first (EMM) upper layer 402 may, or may not (in a scenario not reflected in FIG. 4), send an IPL message indicating EPC to the second (5GMM) upper layer 404. If the second (5GMM) upper layer 404 receives the IPL message from the first (EMM) upper layer 402, the second (5GMM) upper layer 404 may stop or suspend running, or may terminate, initialize or reset itself.

In another implementation, the first upper layer 402 is a coordination layer (e.g., coordination layer 174) and the second upper layer 404 is either an EMM layer or a 5GMM layer depending on whether the coordination layer 402 chooses EPC or 5GC. If the coordination layer 402 chooses 416 EPC as the CN type, the first (coordination) upper layer 402 sends 420 an IPL message indicating EPC as the CN type to the second (EMM) upper layer 404, and sends 422 another IPL message indicating EPC as the CN type to the RRC layer 158. The second (EMM) upper layer 404 may then perform an EPS MM (e.g., attach or tracking area update) procedure. If the first (coordination) upper layer 402 instead chooses 416 5GC as the CN type, the first (coordination) upper layer 402 sends 420 an IPL message indicating 5GC as the CN type to the second (5GMM) upper layer 404, and sends 422 another IPL message indicating 5GC to the RCC layer 158. The second (5GMM) upper layer 404 may then perform a 5GS MM (e.g., registration) procedure.

In an additional implementation, the first upper layer 402 is a 5GMM layer of the MM layer(s) 172 and the second upper layer 404 is an EMM layer of the MM layer(s) 172. If the first (5GMM) upper layer 402 chooses 416 EPC as the CN type, the first (5GMM) upper layer 402 sends 420 an IPL message indicating EPC as the CN type to the second (EMM) upper layer 404, and sends 422 another IPL message indicating EPC as the CN type to the RRC layer 158. The second (EMM) upper layer 404 may then perform an EPS MM (e.g., attach or tracking area update) procedure. If the first (5GMM) upper layer 402 instead chooses 416 5GC as the CN type, the first (5GMM) layer 402 sends an IPL message indicating 5GC as the CN type to the RRC layer 158. The first (5GMM) upper layer 402 may then perform an 5GS MM (e.g., registration) procedure. The first (5GMM) layer 402 may, or may not (in a scenario not reflected in FIG. 4), send an IPL message indicating 5GC to the second (EMM) upper layer 404. If the second (EMM) upper layer 404 receives the IPL message from the first (5GMM) upper layer 402, the second (EMM) upper layer 404 may stop or suspend running, or may terminate, initialize or reset itself.

Referring next to FIG. 5, an example method 500 for choosing a CN type can be implemented in the UE 102. As noted above, the method 500 represents a particular embodiment of the method 200 in which the upper layer that chooses a CN type differs from the upper layer that informs the RRC layer 158 of the chosen CN type. In the method 500, the UE 102 camps on the EUTRA cell 106-1 at block 502, receives a SIB for the EUTRA cell 106-1 at block 504, and determines, based on the SIB, that the base station 104-1 is connected to both an EPC and a 5GC at block 506. Blocks 502, 504 and 506 may be the same as blocks 202, 204 and 206, respectively, of the method 200, for example.

At block 508, the UE 102 communicates both CN types (EPC and 5GC) from the RRC layer 158 to a first upper layer (e.g., a first one of the MM layer(s) 172, or the coordination layer 174). For example, the RRC layer 158 may generate an IPL message that specifies both CN types, and send the IPL message to the first upper layer. In other implementations, the RRC layer 158 includes each of the two CN types in a different IPL message sent to the first upper layer (e.g., as discussed above in connection with block 308 of the method 300).

At block 510, the UE 102 chooses one of the CN types (EPC or 5GC) at the first upper layer. In some implementations, the first upper layer chooses the CN type according to a predetermined rule (e.g., as discussed above in connection with block 210 of the method 200).

At block 512, the UE 102 communicates the chosen CN type from the first upper layer to a second upper layer (e.g., one of the MM layer(s) 172 if the first upper layer is the coordination layer 174, or a different one of the MM layer(s) 172 if the first upper layer is also one of the MM layer(s) 172). For example, the first upper layer may generate an IPL message that specifies the chosen CN type, and send the IPL message to the second upper layer. In some implementations, the second upper layer to which the first upper layer communicates the chosen CN type depends upon which CN type the UE 102 chose at block 510. For example, the second upper layer may be an EMM if EPC is chosen, or a 5GMM if 5GC is chosen (e.g., as discussed below in connection with messaging diagram 600).

At block 514, the UE 102 communicates the chosen CN type from the second upper layer to the RRC layer 158. To this end, the second upper layer may generate another IPL message specifying the chosen CN type, and send the IPL message to the RRC layer 158. For example, the IPL message may include "EPC" if EPC is chosen, or "5GC" if 5GC is chosen. In another implementation, the IPL message includes "5GC" if 5GC is chosen, and omits "5GC" if EPC is chosen (i.e., the IPL message only implicitly identifies EPC). In yet another implementation, the IPL message includes "EPC" if EPC is chosen, and omits "EPC" if 5GC is chosen (i.e., the IPL message only implicitly identifies 5GC). In still other embodiments, the IPL message only implicitly indicates the chosen CN type regardless of which CN type is chosen (e.g., as discussed above in connection with block 212 of the method 200).

In some implementations and/or scenarios, the method 500 includes one or more additional blocks not shown in FIG. 5. For example, the method 500 may include an additional block, after block 514, at which the UE 102 performs an MM and/or connection establishment procedure in accordance with the chosen CN type (e.g., as discussed above in connection with the method 200).

While FIG. 5 corresponds to a scenario in which the base station 104-1 is connected to both the EPC 112 and the 5GC 114, the contents of the SIB received at block 504, and the operation of UE 102 after receiving the SIB, differ in scenarios where the base station 104-1 is instead only connected to the EPC 112 or only connected to the 5GC 114. If the base station 104-1 is only connected to the EPC 112, for example, the SIB received at block 504 indicates (explicitly or implicitly) EPC and not 5GC, the RRC layer 158 determines that the base station 104-1 is connected to only an EPC at block 506, the RRC layer 158 communicates the CN type "EPC" to the first upper layer at block 508, the first upper layer chooses EPC as the CN type at block 510, the first upper layer communicates EPC as the chosen CN type to the second upper layer at block 512, and the second upper layer communicates EPC as the chosen CN type to the RRC layer 158 at block 514. Conversely, if the base station 104-1 is only connected to the 5GC 114, the SIB received at block 504 indicates (explicitly or implicitly) 5GC and not EPC, the RRC layer 158 determines that the base station 104-1 is connected to only a 5GC at block 506, the RRC layer 158 communicates the CN type "5GC" to the first upper layer at block 508, the first upper layer chooses 5GC as the CN type at block 510, the first upper layer communicates 5GC as the chosen CN type to the second upper layer at block 512, and the second upper layer communicates 5GC as the chosen CN type to the RRC layer 158 at block 514.

In some implementations, and in scenarios where the UE 102 selects the EUTRA cell 106-1 in response to a redirection command (e.g., an RRC Release message or an RRC Connection Release message) that indicates a commanded CN type, the RRC layer 158 includes the commanded CN type in the IPL message that the RRC layer 158 sends to the first upper layer at block 508. In such a scenario, the first upper layer chooses the commanded CN type as the CN type, and the RRC layer 158 may or may not communicate the available CN type(s) indicated in the SIB to the first upper layer. In some implementations where the RRC layer 158 sends the CN type(s) indicated in the SIB to the first upper layer at block 508, the first upper layer simply ignores the CN type(s) indicated in the SIB, and indicates only the chosen (commanded) CN type in the IPL message sent to the second upper layer at block 512. The second upper layer then includes the chosen (commanded) CN type in the IPL message that the second upper layer sends to the RRC layer 158 at block 514. Alternatively, in other implementations where the RRC layer 158 sends the CN type(s) indicated in the SIB to the first upper layer at block 508, the first upper layer forwards the CN type(s) indicated in the SIB, and also the chosen (commanded) CN type, to the second upper layer at block 512. The second upper layer may then communicate only the chosen (commanded) CN type to the RRC layer 158 at block 514, or the RRC layer 158 may simply ignore any non-commanded CN type(s) communicated by the second upper layer.

FIG. 6 is a messaging diagram 600 depicting messages exchanged between the base station 104-1 and the UE 102, as well as messages exchanged between various layers of the protocol stack 150 within the UE 102, in accordance with one implementation of the method 500. In addition to the RRC layer 158, these layers include a first upper layer 602 (i.e., a first layer above the RRC layer 158) and a second layer 604 (i.e., a second layer above the RRC layer 158, and possibly also above the first upper layer 602). In some implementations, the first upper layer 602 is the coordination layer 174 and the second upper layer 604 is one of the MM layer(s) 172. In other implementations, the first upper layer 602 is a first one of the MM layer(s) 172 and the second upper layer 604 is a second one of the MM layer(s) 172. Examples of both of these implementations are discussed in further detail below.

In the messaging diagram 600, the base station 104-1 transmits 610 (e.g., broadcasts) a SIB1, which the UE 102 receives and processes at the RRC layer 158. In other implementations, the UE 102 receives the SIB1 from another source, such as the base station 104-2 (e.g., in a redirection command). The RRC layer 158 determines 612 that the base station 104-1 is connected to both an EPC and a 5GC, and sends 614 an IPL message indicating both CN types to the first upper layer 602. The first upper layer 602 then chooses 616 either EPC or 5GC as the CN type, and sends 618 an IPL message indicating the chosen CN type (EPC or 5GC) to the second upper layer 604. The second upper layer 604 then sends 620 an IPL message indicating the chosen CN type to the RRC layer 158.

In one implementation, the first upper layer 602 is an EMM layer of the MM layer(s) 172 and the second upper layer 604 is a 5GMM layer of the MM layer(s) 172. If the first (EMM) upper layer 602 chooses 616 5GC as the CN type, the first (EMM) upper layer 602 sends 618 an IPL message indicating 5GC as the CN type to the second (5GMM) layer 604, and the second (5GMM) upper layer 604 sends 620 another IPL message indicating 5GC as the CN type to the RRC layer 158. The second (5GMM) upper layer 604 may then perform a 5GS MM (e.g., registration) procedure. If the first (EMM) upper layer 602 instead chooses 616 EPC as the CN type, the first (EMM) upper layer 602 sends an IPL message indicating EPC as the CN type to the RRC layer 158. The first (EMM) upper layer 602 may then perform an EPS MM (e.g., attach or tracking area update) procedure. The first (EMM) upper layer 602 may, or may not (in a scenario not reflected in FIG. 6), send an IPL message indicating EPC to the second (5GMM) upper layer 604. If the second (5GMM) upper layer 604 receives the IPL message from the first (EMM) upper layer 602, the second (5GMM) upper layer 604 may stop or suspend running, or may terminate, initialize or reset itself.

In another implementation, the first upper layer 602 is a coordination layer (e.g., coordination layer 174) and the second upper layer 604 is either an EMM layer or a 5GMM layer depending on whether the coordination layer 602 chooses EPC or 5GC. If the first (coordination) upper layer 602 chooses 616 EPC as the CN type, the first (coordination) upper layer 602 sends 618 an IPL message indicating EPC as the CN type to the second (EMM) upper layer 604, and the second (EMM) upper layer 604 sends 620 another IPL message indicating EPC as the CN type to the RRC layer 158. The second (EMM) upper layer 604 may then perform an EPS MM (e.g., attach or tracking area update) procedure.

If the first (coordination) upper layer 602 instead chooses 616 5GC as the CN type, the first (coordination) upper layer 602 sends 618 an IPL message indicating 5GC as the CN type to the second (5GMM) upper layer 604, and the second (5GMM) upper layer 604 sends 620 another IPL message indicating 5GC to the RCC layer 158. The second (5GMM) upper layer 604 may then perform a 5GS MM (e.g., registration) procedure. In some implementations, the coordination layer may be implemented as part of the RRC layer 158. That is, the coordination layer may be implemented as a sub-function of the RRC layer 158. In this case, the IPL message sent 614 from the RRC layer 158 to the first upper layer 602 is not needed, and the IPL message sent 620 from the second upper layer 604 to the RRC layer 158 may or may not be needed. In other implementations, the coordination layer may be implemented outside the RRC layer 158.

In an additional implementation, the first upper layer 602 is an 5GMM layer of the MM layer(s) 172 and the second upper layer 604 is an EMM layer of the MM layer(s) 172. If the first (5GMM) upper layer 602 chooses 616 EPC as the CN type, the first (5GMM) upper layer 602 sends 618 an IPL message indicating EPC as the CN type to the second (EMM) layer 604, and the second (EMM) upper layer 604 sends 620 another IPL message indicating EPC as the CN type to the RRC layer 158. The second (EMM) upper layer 604 may then perform a EPS MM (e.g., attach or tracking area update) procedure. If the first (5GMM) upper layer 602 instead chooses 616 5GC as the CN type, the first (5GMM) upper layer 602 sends an IPL message indicating 5GC as the CN type to the RRC layer 158. The first (5GMM) upper layer 602 may then perform an EPS MM (e.g., registration) procedure. The first (5GMM) upper layer may or may not send an IPL message indicating 5GC to the second (EMM) upper layer 604 (in a scenario not reflected in FIG. 6). If the second (EMM) upper layer 604 receives the IPL message from the first (5GMM) layer 602, the second (EMM) upper layer 604 may stop running or terminate, initialize or reset itself.

Figure 7:
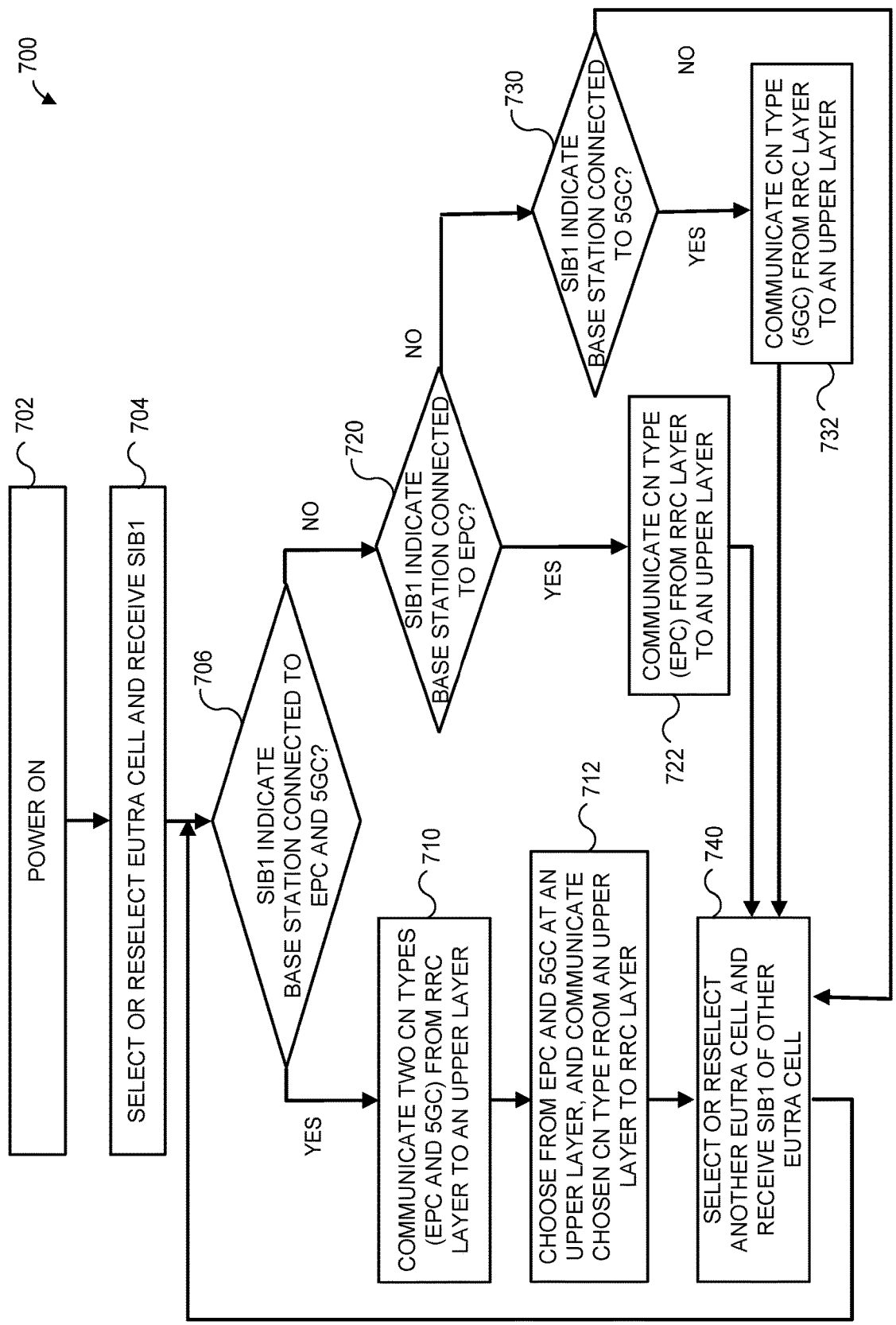
FIG. 7 is a flow diagram of an example method in the user device for choosing an EPC or a 5GC in an EUTRA cell via which only one, or both, CN types is/are available.

Whereas FIGS. 2-6 correspond to a specific scenario in which the base station 104-1 is connected to both the EPC 112 and the 5GC 114, FIGS. 7-10 depict methods that account for alternative scenarios (e.g., where the base station 104-1 is connected to a CN of only one type, or is instead connected to CNs of both types). Referring first to FIG. 7, an example method 700 can be implemented in the UE 102. Initially, at block 702, the UE 102 powers on. At block 704, the UE 102 selects or reselects the EUTRA cell 106-1, and receives a SIB1 associated with EUTRA cell 106-1. The SIB1 may be broadcast by the base station 104-1, for example, or included in a redirection command the UE 102 receives from the base station 104-2.

At block 706, the UE 102 determines (e.g., at the RRC layer 158) whether the SIB1 indicates that the base station 104-1 is connected to both an EPC and a 5GC. If so, flow proceeds to block 710, where the UE 102 communicates the two CN types from the RRC layer 158 to an upper layer (e.g., one of the MM layer(s) 172, or the coordination layer 174). Next, at block 712, the UE 102 chooses either EPC or 5GC as the CN type at an upper layer (e.g., one of the MM layer(s) 172 if the RRC layer 158 communicated the two CN types to the coordination layer 174 at block 710, or a second one of the MM layer(s) 172 if the RRC layer 158 communicated the two CN types to a first one of the MM layer(s) 172 at block 710). After block 712, flow proceeds to block 740 (discussed below).

If the UE 102 instead determines at block 706 that the SIB1 does not indicate that the base station 104-1 is connected to both EPC and 5GC, flow proceeds to block 720, where the UE 102 determines whether the SIB1 indicates that the base station 104-1 is connected to an EPC. If so, flow proceeds to block 722, where the UE 102 communicates the "EPC" CN type from the RRC layer 158 to an upper layer (e.g., one of the MM layer(s) 172, or the coordination layer 174). After block 722, flow proceeds to block 740 (discussed below).

If the UE 102 instead determines at block 720 that the SIB1 does not indicate that the base station 104-1 is connected to an EPC, flow proceeds to block 730, where the UE 102 determines whether the SIB1 indicates that the base station 104-1 is connected to a 5GC. If so, flow proceeds to block 732, where the UE 102 communicates the "5GC" CN type from the RRC layer 158 to an upper layer (e.g., one of the MM layer(s) 172, or the coordination layer 174). After block 732, flow proceeds to block 740. If the UE 102 instead determines at block 730 that the SIB1 does not indicate that the base station 104-1 is connected to a 5GC, flow proceeds to block 740 without communicating the CN type at block 732.

At block 740, the UE 102 selects or reselects another EUTRA cell (e.g., EUTRA cell 106-2), and receives a SIB1 associated with the other EUTRA cell. The SIB1 may be broadcast by the other base station, for example, or may be included in a redirection command the UE 102 receives from the base station 104-1. Block 740 may not occur until after the UE 102 has camped on the EUTRA cell 106-1, and/or communicated (e.g., using voice or data services) via the base station 104-1, for some amount of time, for example.

In some implementations, the method 700 is arranged differently than shown in FIG. 7. For example, the determinations at blocks 706, 720 and 730 may be combined as a single determination. As another example, the determination at block 730 may be made after the determination at block 720 regardless of the outcome of the latter determination, and block 706 may be omitted. As yet another example, the determination at block 730 may precede the determination at block 720.

Figure 8:
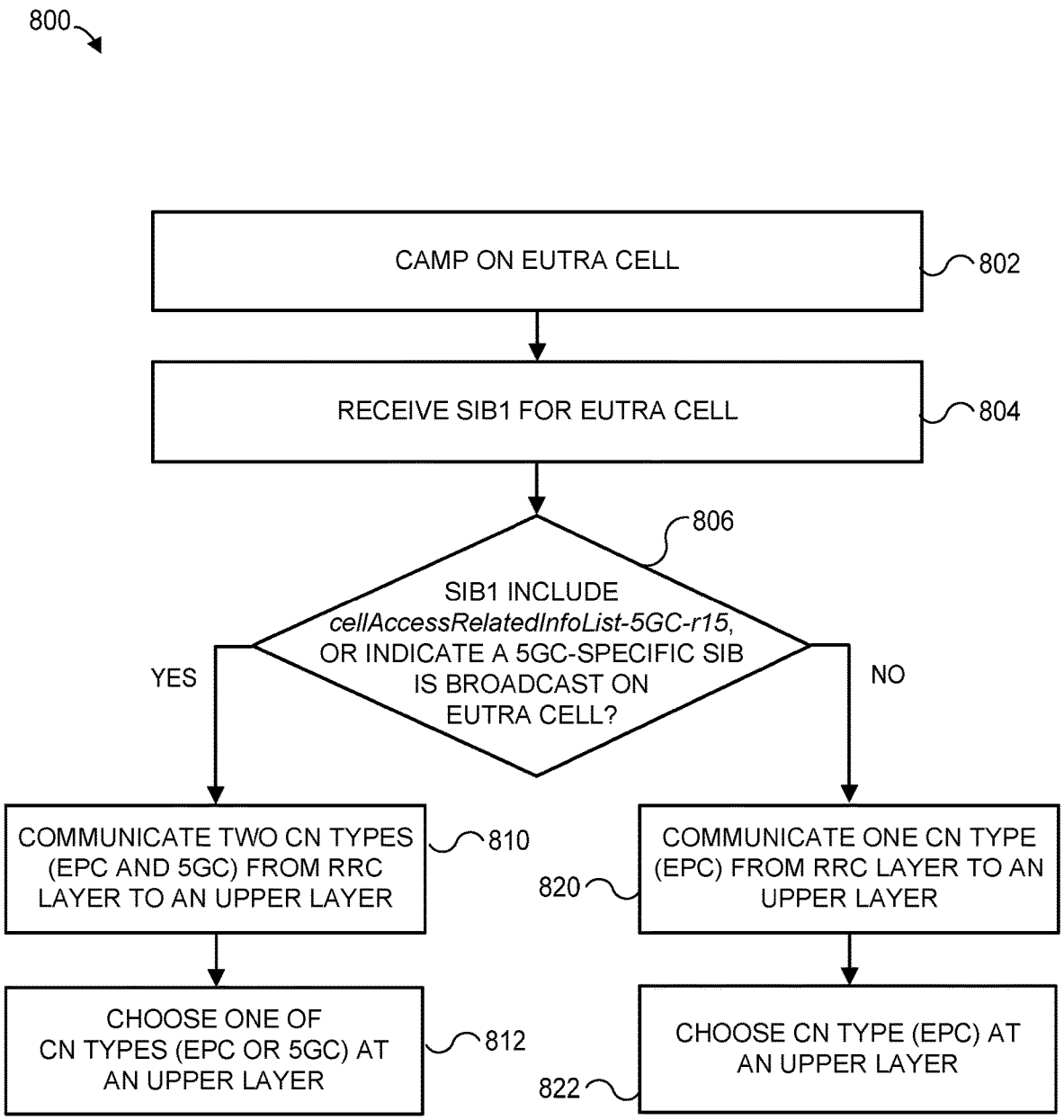
FIG. 8 is a flow diagram of another example method in the user device for choosing an EPC or a 5GC in an EUTRA cell via which only one, or both, CN types is/are available, corresponding to a first specific implementation.
Figure 9:
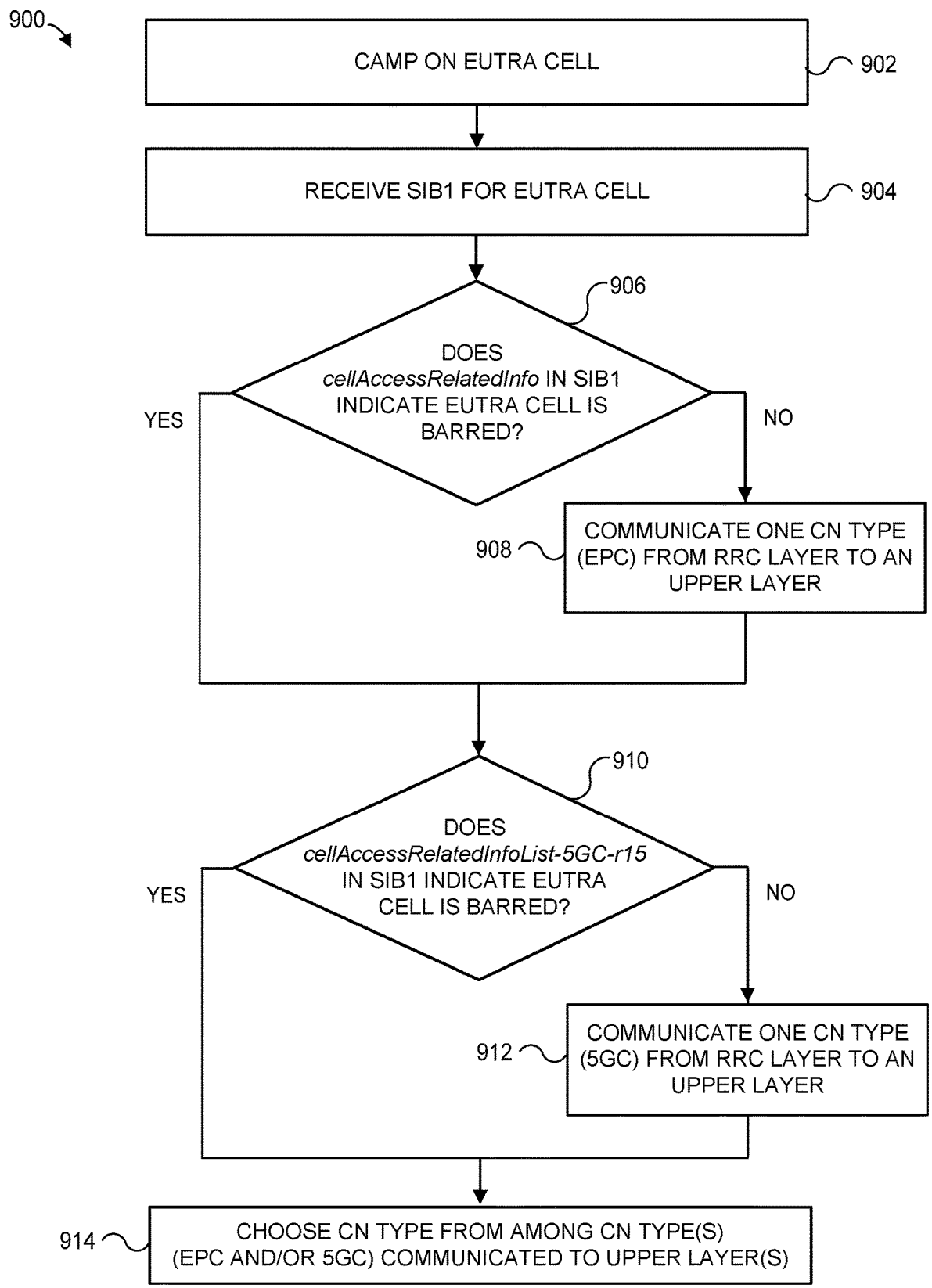
FIG. 9 is a flow diagram of another example method in the user device for choosing an EPC or a 5GC in an EUTRA cell via which only one, or both, CN types is/are available, corresponding to a second specific implementation.
Figure 10:
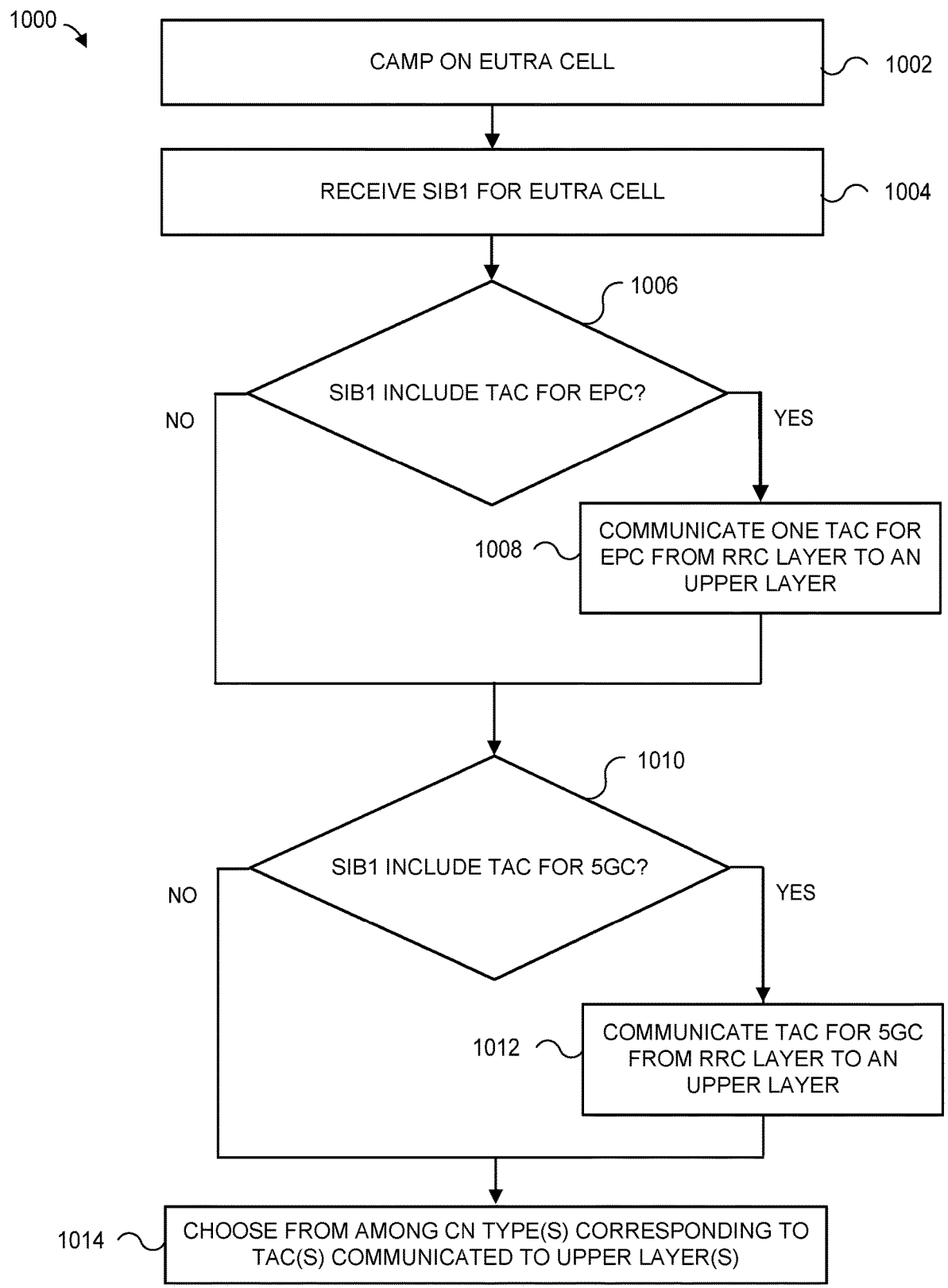
FIG. 10 is a flow diagram of another example method in the user device for choosing an EPC or a 5GC in an EUTRA cell via which only one, or both, CN types is/are available, corresponding to a third specific implementation.

FIGS. 8-10 correspond to more specific implementations of methods for choosing an EPC or a 5GC when camped on an EUTRA cell in which an EPC and/or a 5GC is/are available. Referring first to FIG. 8, in an example method 800 implemented in the UE 102, the UE 102 camps on the EUTRA cell 106-1 at block 802 (e.g., after selecting or reselecting the EUTRA cell 106-1). At block 804, the UE 102 receives a SIB1 for the EUTRA cell 106-1. The SIB1 may be broadcast by the base station 104-1, for example, or (e.g., if block 804 occurs before block 802) may be included in a redirection command the UE 102 receives from the base station 104-2.

At block 806, the UE 102 determines whether the SIB1 includes cellAccessRelatedInfoList-5GC-r15 (i.e., a field of the SIB1 that contains, for 5GC, a list allowing signaling of access-related information on a per-PLMN basis). In an alternative implementation (also represented in FIG. 8), the UE determines whether the SIB1 indicates that a 5GC-specific SIB (e.g., a SIB that includes at least one unified access control (UAC) configuration, such as a SIB27) is broadcast/available on the EUTRA cell 106-1.

If the UE 102 determines that the SIB1 includes cellAccessRelatedInfoList-5GC-r15 (or that the SIB1 indicates the 5GC-specific SIB is broadcast on the EUTRA cell 106-1), flow proceeds to block 810, where the UE 102 communicates two CN types (both EPC and 5GC) from the RRC layer 158 to an upper layer (e.g., one of the MM layer(s) 172, or the coordination layer 174). After block 810, at block 812, the UE 102 chooses one of those CN types (EPC or 5GC) at an upper layer (e.g., one of the MM layer(s) 172 if the RRC layer 158 communicated the two CN types to the coordination layer 174 at block 810, or a second one of the MM layer(s) 172 if the RRC layer 158 communicated the two CN types to a first one of the MM layer(s) 172 at block 810).

If the UE 102 instead determines at block 806 that the SIB1 does not include cellAccessRelatedInfoList-5GC-r15 (or that the SIB1 does not indicate the 5GC-specific SIB is broadcast on the EUTRA cell 106-1), flow proceeds to block 820. The UE 102 infers from the determination at block 806 that only an EPC is available in the EUTRA cell 106-1, and at block 820 communicates only one CN type (EPC) from the RRC layer 158 to an upper layer (e.g., the same upper layer to which the two CN types would otherwise have been communicated at block 810). Thereafter, at block 822, the UE 102 chooses EPC as the CN type at an upper layer (e.g., the same upper layer at which a CN type would otherwise have been chosen at block 812).

Referring next to FIG. 9, in an example method 900 implemented in the UE 102, the UE 102 camps on the EUTRA cell 106-1 at block 902 (e.g., after selecting or reselecting the EUTRA cell 106-1). At block 904, the UE 102 receives a SIB1 for the EUTRA cell 106-1. The SIB1 may be broadcast by the base station 104-1, for example, or (e.g., if block 904 occurs before block 902) may be included in a redirection command the UE 102 receives from the base station 104-2.

At block 906, the UE 102 determines whether a cellAccessRelatedInfoList field of the SIB1 (i.e., a field of the SIB1 that contains, for EPC, a list allowing signaling of access-related information on a per-PLMN basis) indicates that the EUTRA cell 106-1 is barred. If the UE 102 determines that the cellAccessRelatedInfoList does not indicate that the EUTRA cell 106-1 is barred, flow proceeds to block 908 where, in response to the determination at block 906, the UE 102 communicates the CN type "EPC" from the RRC layer 158 to an upper layer (e.g., an EMM layer of the MM layer(s) 172, or the coordination layer 174). After block 908, flow proceeds to block 910. If the UE 102 instead determines at block 906 that the cellAccessRelatedInfoList field indicates that the EUTRA cell 106-1 is barred, flow proceeds to block 910 without communicating a CN type at block 908.

At block 910, the UE 102 determines whether a cellAccessRelatedInfoList-5GC-r15 field of the SIB1 (i.e., a field of the SIB1 that contains, for 5GC, a list allowing signaling of access-related information on a per-PLMN basis) indicates that the EUTRA cell 106-1 is barred. If the UE 102 determines that the cellAccessRelatedInfoList-5GC-r15 does not indicate that the EUTRA cell 106-1 is barred, flow proceeds to block 912 where, in response to the determination at block 910, the UE 102 communicates the CN type "5GC" from the RRC layer 158 to an upper layer (e.g., a 5GMM layer of the MM layer(s) 172, or the coordination layer 174). In an alternative implementation, the UE 102 communicates EPC and/or 5GC as available CN types to an upper layer in a single IPL message, rather than (in some scenarios) sending separate IPL messages at blocks 908 and 912.

After block 912, flow proceeds to block 914. If the UE 102 instead determines at block 910 that the cellAccessRelatedInfoList-5GC-r15 indicates that the EUTRA cell 106-1 is barred, flow proceeds to block 914 without communicating the CN type at block 912. At block 914, the UE 102 chooses a CN type from among the one or more CN types that were communicated from the RRC layer 158 to an upper layer (at block 908 and/or at block 912).

In alternative implementations, the RRC layer 158 sends the upper layer an IPL message that explicitly indicates that the base station 104-1 is not connected to an EPC and/or not connected to a 5GC. For example, the RRC layer 158 may communicate such an indication for EPC to an upper layer if the UE 102 determines at block 906 that the cellAccessRelatedInfoList field indicates the EUTRA cell is barred, or communicate such an indication for 5GC to an upper layer if the UE 102 determines at block 910 that the cellAccessRelatedInfoList-5GC-r15 field indicates the EUTRA cell is barred. Alternatively, the RRC layer 158 may communicate lack of availability for a particular CN type within the IPL message that communicates availability of the other CN type, or in an additional IPL message prior to block 914.

Referring next to FIG. 10, in an example method 1000 implemented in the UE 102, the UE 102 camps on the EUTRA cell 106-1 at block 1002 (e.g., after selecting or reselecting the EUTRA cell 106-1). At block 1004, the UE 102 receives a SIB1 for the EUTRA cell 106-1. The SIB1 may be broadcast by the base station 104-1, for example, or (e.g., if block 1004 occurs before block 1002) may be included in a redirection command the UE 102 receives from the base station 104-2.

At block 1006, the UE 102 determines whether the SIB1 includes a tracking area code (TAC) for EPC (e.g., included within a cellAccessRelatedInfo field or a cellAccessRelatedInfoList-r14 field of the SIB1). If so, flow proceeds to block 1008 where, in response to the determination at block 1006, the UE 102 communicates the TAC for EPC from the RRC layer 158 to an upper layer (e.g., an EMM layer of the MM layer(s) 172, or the coordination layer 174). After block 1008, flow proceeds to block 1010. If the UE 102 instead determines at block 1006 that the SIB1 does not include a TAC for EPC, flow proceeds to block 1010 without communicating a TAC at block 1008.

At block 1010, the UE 102 determines whether the SIB1 includes a TAC for 5GC (e.g., included within a cellAccessRelatedInfoList-5GC-r15 field of the SIB1). If so, flow proceeds to block 1012 where, in response to the determination at block 1010, the UE 102 communicates the TAC for 5GC from the RRC layer 158 to an upper layer (e.g., a 5GMM layer of the MM layer(s) 172, or the coordination layer 174). The TAC for 5GC may have the same value as the TAC for EPC, or a different value, depending on the scenario. In an alternative implementation, the UE 102 communicates the TAC for EPC and/or the TAC for 5GC to an upper layer in a single IPL message, rather than (in some scenarios) sending separate IPL messages at blocks 1008 and 1012.

After block 1012, flow proceeds to block 1014. If the UE 102 instead determines at block 1010 that the SIB1 does not include a TAC for 5GC, flow proceeds to block 1014 without communicating a TAC at block 1012. In an alternative implementation, the RRC layer 158 sends to an upper layer an IPL message that explicitly indicates that the SIB1 does not include a TAC for 5GC.

At block 1014, the UE 102 chooses a CN type from among the one or two CN types that correspond to the one or two TACs that were communicated from the RRC layer 158 to an upper layer at block 1008 and/or block 1012. The UE 102 may make the choice of CN type by determining which TAC (TAC for EPC or TAC for 5G) to use, for example. In some implementations, a same upper layer that received the TAC(s) at blocks 1008 and/or 1012 also makes the choice at block 1014. In other implementations, the layer(s) that received the TAC(s) at blocks 1008 and/or 1012 communicate(s) the respective TAC(s) to another upper layer, which then makes the choice at block 1014.

In one alternative implementation of the method 1000, if the SIB1 does not include a TAC for 5GC, the UE 102 communicates from the RRC layer 158 to an upper layer (e.g., one of the MM layer(s) 172, or the coordination layer 174) an indication that no TAC was received for the EUTRA cell 106-1. The upper layer, or another upper layer, then infers that the base station 104-1 is not connected to 5GC in response to the indication of no TAC for 5GC.

In other implementations of the method 1000, the UE 102 only performs block 1008 if the cellAccessRelatedInfo field in the SIB1 expressly indicates that the EUTRA cell is not barred, or does not perform block 1008 if the cellAccessRelatedInfo field expressly indicates that the EUTRA cell is barred. Similarly, in some implementations, the UE 102 only performs block 1012 if the cellAccessRelatedInfoList-5GC-r15 field in the SIB1 expressly indicates that the EUTRA cell is not barred, or does not perform block 1012 if the cellAccessRelatedInfoList-5GC-r15 field expressly indicates that the EUTRA cell is barred.

In some implementations of the method 1000, the UE 102 communicates a first PLMN identity for EPC (e.g., from a field of the SIB1, such as cellAccessRelatedInfo) from the RRC layer 158 to an upper layer, and communicates a second PLMN identity for 5GC (e.g., from another field of the SIB1, such as cellAccessRelatedInfoList-5GC-r15) from the RRC layer 158 to the same upper layer or another upper layer. The PLMN identity for 5GC may have the same value as the PLMN identity for EPC, or a different value, depending on the scenario.

In one implementation where the RRC layer 158 communicates PLMN identities to an upper layer, a first upper layer of the UE 102 (e.g., one of the MM layer(s) 172) receives the PLMN identity for EPC, and/or the PLMN identity for 5GC, from the RRC layer 158. If the first upper layer receives both PLMN identities, the first upper layer determines whether to use the PLMN identity for EPC or the PLMN identity for 5GC in accordance with a predetermined rule (e.g., a priority-based rule). Similarly, the first upper layer receives the TAC for EPC at block 1008, and/or the TAC for 5GC at block 1012, from the RRC layer 158. If the first upper layer receives both TACs, the first upper layer determines whether to use the TAC for EPC or the TAC for 5GC in accordance with the same predetermined rule.

In another implementation where the RRC layer 158 communicates PLMN identities to an upper layer, a first upper layer of the UE 102 (e.g., one of the MM layer(s) 172, or the coordination layer 174) again receives the PLMN identity for EPC, and/or the PLMN identity for 5GC, from the RRC layer 158. Similarly, the first upper layer receives the TAC for EPC at block 1008, and/or the TAC for 5GC at block 1012, from the RRC layer 158. In this implementation, however, a second upper layer of the UE 102 (e.g., one of the MM layer(s) 172 if the first upper layer is the coordination layer 174, or a second one of the MM layer(s) 172 if the first upper layer is a first one of the MM layer(s) 172) receives the PLMN identity for EPC, and/or the PLMN identity for 5GC, from the first upper layer. Similarly, the second upper layer receives the TAC for EPC, and/or the TAC for 5GC, from the first upper layer. If the second upper layer receives both PLMN identities and both TACs, the second upper layer determines whether to use the TAC and PLMN identity for EPC, or the TAC and PLMN identity for 5GC, in accordance with a predetermined rule (e.g., a priority-based rule).

In some implementations where the UE 102 chooses to use the TAC (and possibly PLMN identity) for EPC, the UE 102 performs an EPS NAS Attach procedure (e.g., by transmitting an EPS NAS ATTACH REQUEST message to the EPC 112 via the base station 104-1), or an EPS NAS Tracking Area Update procedure (e.g., by transmitting an EPS NAS TRACKING AREA UPDATE REQUEST message to the EPC 112 via the base station 104-1) after block 1014. Conversely, in some implementations where the UE 102 chooses to use the TAC (and possibly PLMN identity) for 5GC, the UE 102 performs a 5GS NAS Registration procedure (e.g., by transmitting a 5GS NAS REGISTRATION REQUEST message to the 5GC 114 via the base station 104-1) after block 1014.

Figure 11:
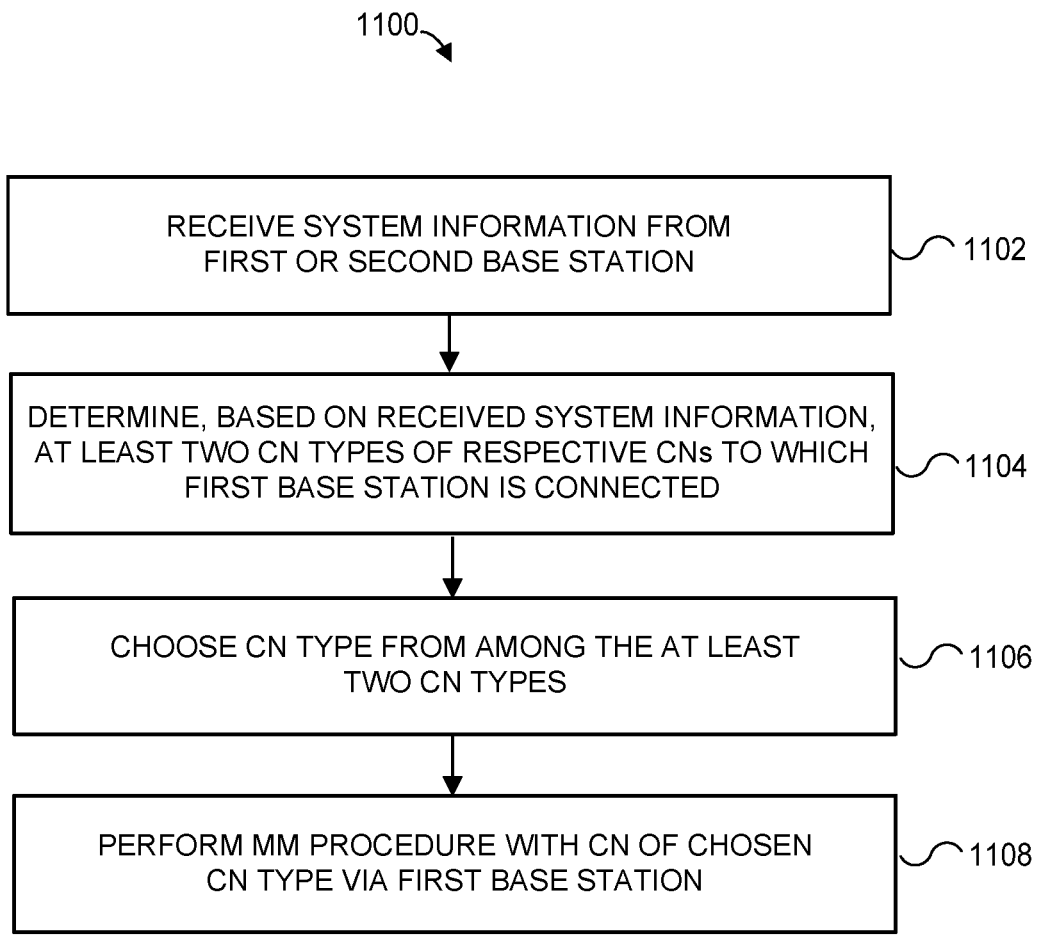
FIG. 11 is a flow diagram of an example method in a user device for choosing a CN type in a cell associated with a base station connected to CNs of at least two different CN types.

For further clarity, FIG. 11 illustrates an example method 1100 that a UE of this disclosure can implement to choose a CN type in a cell associated with a base station connected to CNs of at least two different CN types. The method 1100 can be implemented in hardware, software, firmware, or any suitable combination of hardware, software and firmware.

The UE that implements the method 1100 supports an air interface for connecting to CNs of different types. For example, the UE can support EUTRA, via which the UE can access both EPC CNs and 5GC CNs.

At block 1102, the UE (e.g., UE 102) receives system information from a first base station (e.g., base station 104-1) or a second base station (e.g., base station 104-2). The system information may be a SIB1 that was broadcast by the first base station, or included with a redirection command from the second base station, for example.

At block 1104, the UE determines, based on the system information received at block 1102, at least two CN types of respective CNs to which the first base station is connected. The UE may determine the CN types based on an explicit indication in the system information, or may infer the CN types from the system information. For example, the UE may determine a particular CN type (i.e., that the particular CN type is available) based on (1) whether the system information indicates that additional system information, associated with the particular CN type, is available for a cell associated with the first base station (e.g., a SIB27 for 5GC), (2) whether the system information indicates that a cell associated with the first base station is barred with respect to the particular CN type, and/or (3) whether the system information includes a tracking area code associated with the particular CN type.

At block 1106, the UE chooses a CN type from among the at least two CN types determined at block 1104. The UE may choose the CN type according to a predetermined rule that assigns priorities (or conditional priorities, etc.) to particular CN types, for example.

At block 1108, the UE performs, via the base station, an MM procedure with a CN of the chosen CN type. The MM procedure may be an EPS NAS Attach procedure, an EPS NAS Tracking Area Update procedure, or a 5GS NAS Registration procedure, for example.

In some implementations, the method 1100 includes one or more additional blocks not shown in FIG. 11. For example, the method 1100 may include an additional block, occurring after block 1104 but before block 1106, in which the UE sends a first IPL message indicating the at least two CN types from an RRC layer of a communication protocol stack (e.g., RRC layer 158) to a first upper layer above the RRC layer. The UE may then choose the CN type (at block 1106) at the first upper layer, or at a second upper layer that is also above the RRC layer.

Additionally or alternatively, in some implementations where the CN type is chosen at the first upper layer, the first upper layer sends an IPL message indicating the chosen CN type to a second upper layer. The first upper layer may be an MM layer associated with a first CN type (e.g., one of the MM layer(s) 172), and the second upper layer may be an MM layer associated with a second CN type (e.g., another one of the MM layer(s) 172). In one such implementation, the first upper layer only sends the chosen CN type to the second upper layer if the second upper layer is an MM layer associated with the chosen CN type. Alternatively, the first upper layer may be a coordination layer (e.g., coordination layer 174), and the second upper layer may be an MM layer associated with whichever CN type the UE chooses at the coordination layer.

Additionally or alternatively, in some implementations, the method 1100 includes an additional block, occurring after block 1106 but before block 1108, in which the UE sends an IPL message from the first or second upper layer to the RRC layer. The method 1100 may also include a block in which the UE determines the chosen CN type, at the RRC layer, based on that IPL message. For example, the IPL message may include a temporary user device identity that is associated with the chosen CN type (e.g., S-TMSI for EPC, or S-TMSI for 5GC), information relating to a network node that is associated with the chosen CN type (e.g., MME information, or AMF information), or information relating to network functionality that is associated with the chosen CN type (e.g., S-NSSAI for 5GC, with the lack thereof indicating EPC).

Additionally or alternatively, in some implementations, the method 1100 includes an additional block in which the UE sends an IPL message indicating first and second information, from the system information and specific to a first and second CN type, respectively, from an RRC layer to a first upper layer. The UE may then determine the at least two CN types (at block 1104) at the first upper layer based on the IPL message, and also choose the CN type (at block 1106) at the first upper layer. The first information may include a tracking area code and/or PLMN identity associated with one CN type, and a tracking area code and/or PLMN identity associated with another CN type, for example.

The following additional considerations apply to the foregoing discussion.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-Internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional alternative structural and functional designs for connecting to a core network through the disclosed principles herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

What is claimed is:

1. A method in a user device that supports an air interface for connecting to core networks (CNs) of different types, the method comprising:
  receiving system information from a first base station or a second base station, wherein receiving the system information includes either (i) receiving the system information from the first base station after the user device selects a cell associated with the first base station, or (ii) receiving the system information, with a redirection command, from the second base station;
  determining, based on the received system information, at least two CN types of respective CNs to which the first base station is connected;
  choosing, and at a layer above a radio resource control (RRC) layer of a communication protocol stack, a CN type from among the at least two CN types; and
  performing a mobility management (MM) procedure with a CN of the chosen CN type via the first base station.

2. The method of claim 1, further comprising:
  after determining the at least two CN types and prior to choosing the CN type, sending a first inter-protocol layer (IPL) message indicating the at least two CN types from the RRC layer to a first upper layer above the RRC layer,
  wherein choosing the CN type includes choosing the CN type at either the first upper layer or a second upper layer above the RRC layer.

3. The method of claim 2, wherein the at least two CN types include a first CN type and a second CN type, the first upper layer is an MM layer associated with the first CN type, the second upper layer is an MM layer associated with the second CN type, and choosing the CN type includes choosing the CN type at the first upper layer, the method further comprising:

determining whether to send a second IPL message indicating the chosen CN type to the second upper layer based on whether the chosen CN type is the first CN type or the second CN type.

4. The method of claim 2, wherein the at least two CN types include a first CN type and a second CN type, the first upper layer is a coordination layer, the second upper layer is an MM layer associated with the first CN type, a third upper layer above the RRC layer is an MM layer associated with the second CN type, and choosing the CN type includes choosing the CN type at the first upper layer, the method further comprising:
determining whether to (i) send a second IPL message indicating the chosen CN type to the second upper layer, or (ii) send the second IPL message to the third upper layer, based on whether the chosen CN type is the first CN type or the second CN type.

5. The method of claim 2, further comprising:
after choosing the CN type, sending a second IPL message from the first upper layer or the second upper layer to the RRC layer; and
determining, at the RRC layer, the chosen CN type based on the second IPL message.

6. The method of claim 5, wherein determining the chosen CN type at the RRC layer based on the second IPL message includes determining the chosen CN type based on:
a temporary user device identity, included in the second IPL message, that is associated with the chosen CN type;
information, included in the second IPL message, relating to a network node that is associated with the chosen CN type; or
information, included in the second IPL message, relating to network functionality that is associated with the chosen CN type.

7. The method of claim 1, wherein the at least two CN types include a first CN type and a second CN type, and the system information includes first information specific to the first CN type and second information specific to the second CN type, the method further comprising:
sending an inter-protocol layer (IPL) message indicating the first information and the second information from the RRC layer to a first upper layer above the RRC layer,
wherein determining the at least two CN types includes determining the at least two CN types at the first upper layer based on the IPL message, and
wherein choosing the CN type includes choosing the CN type at the first upper layer.

8. The method of claim 7, wherein the first information includes one or both of (i) a tracking area code associated with the first CN type and (ii) a public land mobile network (PLMN) identity associated with the first CN type, and the second information includes one or both of (i) a tracking area code associated with the second CN type and (ii) a PLMN identity associated with the second CN type.

9. The method of claim 1, wherein determining the at least two CN types includes determining whether the first base station is connected to a CN of a particular CN type based on one or more of:
whether the system information indicates that additional system information, associated with the particular CN type, is available for a cell associated with the first base station;
whether the system information indicates that a cell associated with the first base station is barred with respect to the particular CN type; and
whether the system information includes a tracking area code associated with the particular CN type.

10. The method of claim 1, wherein the user device is an internet-of-things (IoT) device.

11. A user device comprising hardware and configured to:
receive system information from a first base station or a second base station, wherein receiving the system information includes either (i) receiving the system information from the first base station after the user device selects a cell associated with the first base station, or (ii) receiving the system information, with a redirection command, from the second base station;
determine, based on the received system information, at least two core network (CN) types of respective CNs to which the first base station is connected;
choose, at a layer above a radio resource control (RRC) layer of a communication protocol stack, a CN type from among the at least two CN types; and
perform a mobility management (MM) procedure with a CN of the chosen CN type via the first base station.

12. The user device of claim 11, wherein the user device is further configured to:
after determining the at least two CN types and prior to choosing the CN type, send a first inter-protocol layer (IPL) message indicating the at least two CN types from the RRC layer to a first upper layer above the RRC layer,
wherein choosing the CN type includes choosing the CN type at either the first upper layer or a second upper layer above the RRC layer.

13. The user device of claim 12, wherein the at least two CN types include a first CN type and a second CN type, the first upper layer is an MM layer associated with the first CN type, the second upper layer is an MM layer associated with the second CN type, and choosing the CN type includes choosing the CN type at the first upper layer, the user device being further configured to:
determine whether to send a second IPL message indicating the chosen CN type to the second upper layer based on whether the chosen CN type is the first CN type or the second CN type.

14. The user device of claim 12, wherein the at least two CN types include a first CN type and a second CN type, the first upper layer is a coordination layer, the second upper layer is an MM layer associated with the first CN type, a third upper layer above the RRC layer is an MM layer associated with the second CN type, and choosing the CN type includes choosing the CN type at the first upper layer, the user device being further configured to:
determine whether to (i) send a second IPL message indicating the chosen CN type to the second upper layer, or (ii) send the second IPL message to the third upper layer, based on whether the chosen CN type is the first CN type or the second CN type.

15. The user device of claim 12, the user device being further configured to:
after choosing the CN type, send a second IPL message from the first upper layer or the second upper layer to the RRC layer; and
determine, at the RRC layer, the chosen CN type based on the second IPL message.

16. The user device of claim 15, wherein determining the chosen CN type at the RRC layer based on the second IPL message includes determining the chosen CN type based on:
a temporary user device identity, included in the second IPL message, that is associated with the chosen CN type;

information, included in the second IPL message, relating to a network node that is associated with the chosen CN type; or
information, included in the second IPL message, relating to network functionality that is associated with the chosen CN type.

17. The user device of claim 11, wherein the at least two CN types include a first CN type and a second CN type, and the system information includes first information specific to the first CN type and second information specific to the second CN type, the user device being further configured to:
send an inter-protocol layer (IPL) message indicating the first information and the second information from the RRC layer to a first upper layer above the RRC layer,
wherein determining the at least two CN types includes determining the at least two CN types at the first upper layer based on the IPL message, and
wherein choosing the CN type includes choosing the CN type at the first upper layer.

18. The user device of claim 17, wherein the first information includes one or both of (i) a tracking area code associated with the first CN type and (ii) a public land mobile network (PLMN) identity associated with the first CN type, and the second information includes one or both of (i) a tracking area code associated with the second CN type and (ii) a PLMN identity associated with the second CN type.

19. The user device of claim 11, wherein determining the at least two CN types includes determining whether the first base station is connected to a CN of a particular CN type based on one or more of:
whether the system information indicates that additional system information, associated with the particular CN type, is available for a cell associated with the first base station;
whether the system information indicates that a cell associated with the first base station is barred with respect to the particular CN type; and
whether the system information includes a tracking area code associated with the particular CN type.

20. The user device of claim 11, wherein the user device is an internet-of-things (IoT) device.

21. A method in a user device that supports an air interface for connecting to core networks (CNs) of different types, the method comprising:
receiving system information from a first base station or a second base station;
determining, based on the received system information, at least two CN types of respective CNs to which the first base station is connected;
choosing, at a layer above a radio resource control (RRC) layer of a communication protocol stack, a CN type from among the at least two CN types; and
performing a mobility management (MM) procedure with a CN of the chosen CN type via the first base station, wherein performing the MM procedure with the CN of the chosen CN type via the first base station includes performing an attach procedure, a tracking area update procedure, or a registration procedure.

22. The method of claim 21, further comprising:
after determining the at least two CN types and prior to choosing the CN type, sending a first inter-protocol layer (IPL) message indicating the at least two CN types from the RRC layer to a first upper layer above the RRC layer,
wherein choosing the CN type includes choosing the CN type at either the first upper layer or a second upper layer above the RRC layer.

23. The method of claim 22, wherein the at least two CN types include a first CN type and a second CN type, the first upper layer is an MM layer associated with the first CN type, the second upper layer is an MM layer associated with the second CN type, and choosing the CN type includes choosing the CN type at the first upper layer, the method further comprising:
determining whether to send a second IPL message indicating the chosen CN type to the second upper layer based on whether the chosen CN type is the first CN type or the second CN type.

24. The method of claim 22, wherein the at least two CN types include a first CN type and a second CN type, the first upper layer is a coordination layer, the second upper layer is an MM layer associated with the first CN type, a third upper layer above the RRC layer is an MM layer associated with the second CN type, and choosing the CN type includes choosing the CN type at the first upper layer, the method further comprising:
determining whether to (i) send a second IPL message indicating the chosen CN type to the second upper layer, or (ii) send the second IPL message to the third upper layer, based on whether the chosen CN type is the first CN type or the second CN type.

25. The method of claim 22, further comprising:
after choosing the CN type, sending a second IPL message from the first upper layer or the second upper layer to the RRC layer; and
determining, at the RRC layer, the chosen CN type based on the second IPL message.

26. The method of claim 25, wherein determining the chosen CN type at the RRC layer based on the second IPL message includes determining the chosen CN type based on:
a temporary user device identity, included in the second IPL message, that is associated with the chosen CN type;
information, included in the second IPL message, relating to a network node that is associated with the chosen CN type; or
information, included in the second IPL message, relating to network functionality that is associated with the chosen CN type.

27. The method of claim 21, wherein the at least two CN types include a first CN type and a second CN type, and the system information includes first information specific to the first CN type and second information specific to the second CN type, the method further comprising:
sending an inter-protocol layer (IPL) message indicating the first information and the second information from the RRC layer to a first upper layer above the RRC layer,
wherein determining the at least two CN types includes determining the at least two CN types at the first upper layer based on the IPL message, and
wherein choosing the CN type includes choosing the CN type at the first upper layer.

28. The method of claim 21, wherein the user device is an internet-of-things (IoT) device.

29. A user device comprising hardware and configured to:
receive system information from a first base station or a second base station;
determine, based on the received system information, at least two core network (CN) types of respective CNs to which the first base station is connected;

choose, at a layer above a radio resource control (RRC) layer of a communication protocol stack, a CN type from among the at least two CN types; and perform a mobility management (MM) procedure with a CN of the chosen CN type via the first base station, wherein receiving the system information includes either (i) receiving the system information from the first base station after the user device selects a cell associated with the first base station, or (ii) receiving the system information, with a redirection command, from the second base station.

30. The user device of claim 29, wherein the user device is further configured to:

after determining the at least two CN types and prior to choosing the CN type, send a first inter-protocol layer (IPL) message indicating the at least two CN types from the RRC layer to a first upper layer above the RRC layer, wherein choosing the CN type includes choosing the CN type at either the first upper layer or a second upper layer above the RRC layer.

31. The user device of claim 30, wherein the at least two CN types include a first CN type and a second CN type, the first upper layer is an MM layer associated with the first CN type, the second upper layer is an MM layer associated with the second CN type, and choosing the CN type includes choosing the CN type at the first upper layer, the user device being further configured to:

determine whether to send a second IPL message indicating the chosen CN type to the second upper layer based on whether the chosen CN type is the first CN type or the second CN type.

32. The user device of claim 30, wherein the at least two CN types include a first CN type and a second CN type, the first upper layer is a coordination layer, the second upper layer is an MM layer associated with the first CN type, a third upper layer above the RRC layer is an MM layer associated with the second CN type, and choosing the CN type includes choosing the CN type at the first upper layer, the user device being further configured to:

determine whether to (i) send a second IPL message indicating the chosen CN type to the second upper layer, or (ii) send the second IPL message to the third upper layer, based on whether the chosen CN type is the first CN type or the second CN type.

33. The user device of claim 30, the user device being further configured to:

after choosing the CN type, send a second IPL message from the first upper layer or the second upper layer to the RRC layer; and determine, at the RRC layer, the chosen CN type based on the second IPL message.

34. The user device of claim 33, wherein determining the chosen CN type at the RRC layer based on the second IPL message includes determining the chosen CN type based on:

a temporary user device identity, included in the second IPL message, that is associated with the chosen CN type;

information, included in the second IPL message, relating to a network node that is associated with the chosen CN type; or information, included in the second IPL message, relating to network functionality that is associated with the chosen CN type.

35. The user device of claim 29, wherein the at least two CN types include a first CN type and a second CN type, and the system information includes first information specific to the first CN type and second information specific to the second CN type, the user device being further configured to:

send an inter-protocol layer (IPL) message indicating the first information and the second information from the RRC layer to a first upper layer above the RRC layer, wherein determining the at least two CN types includes determining the at least two CN types at the first upper layer based on the IPL message, and wherein choosing the CN type includes choosing the CN type at the first upper layer.

36. The user device of claim 29, wherein the user device is an internet-of-things (IoT) device.

* * * * *